United States Patent
Popovic

(10) Patent No.: US 8,340,478 B2
(45) Date of Patent: Dec. 25, 2012

(54) RESONANT OPTICAL MODULATORS

(75) Inventor: Milos Popovic, Boulder, CO (US)

(73) Assignee: Massachusetts Institute of Technology, Cambridge, MA (US)

( * ) Notice: Subject to any disclaimer, the term of this patent is extended or adjusted under 35 U.S.C. 154(b) by 230 days.

(21) Appl. No.: 12/630,322

(22) Filed: Dec. 3, 2009

(65) Prior Publication Data

US 2010/0158429 A1    Jun. 24, 2010

Related U.S. Application Data

(60) Provisional application No. 61/119,622, filed on Dec. 3, 2008.

(51) Int. Cl.
  *G02F 1/035* (2006.01)
  *G02B 6/42* (2006.01)
(52) U.S. Cl. ............... 385/3; 385/2; 385/32; 385/50
(58) Field of Classification Search .............. None
  See application file for complete search history.

(56) References Cited

U.S. PATENT DOCUMENTS

| | | | |
|---|---|---|---|
| 3,558,213 A | 1/1971 | Marcatili | |
| 4,142,775 A | 3/1979 | Ramaswamy et al. | |
| 4,679,893 A | 7/1987 | Ramer | |
| 4,781,424 A | 11/1988 | Kawachi et al. | |
| 4,852,117 A | 7/1989 | Po | |
| 5,241,616 A | 8/1993 | Garcia | |
| 5,371,817 A | 12/1994 | Revelli, Jr. et al. | |
| 5,418,868 A | 5/1995 | Cohen et al. | |
| 5,592,500 A | 1/1997 | Shirasaki | |
| 5,625,403 A | 4/1997 | Hazman | |
| 5,900,637 A | 5/1999 | Smith | |
| 6,025,943 A | 2/2000 | Meekers et al. | |
| 6,031,957 A | 2/2000 | Suzuki et al. | |
| 6,052,495 A | 4/2000 | Little et al. | |
| 6,157,765 A | 12/2000 | Bruce et al. | |
| 6,289,151 B1 | 9/2001 | Kazarinov et al. | |
| 6,351,575 B1 | 2/2002 | Gampp et al. | |
| 6,411,752 B1 * | 6/2002 | Little et al. | 385/17 |
| 6,442,311 B1 | 8/2002 | Barbarossa et al. | |
| 6,480,644 B1 | 11/2002 | MacDonald | |
| 6,529,277 B1 | 3/2003 | Weitekamp | |
| 6,563,631 B2 | 5/2003 | Delprat et al. | |
| 6,636,669 B1 | 10/2003 | Chin et al. | |
| 6,668,006 B1 * | 12/2003 | Margalit et al. | 372/97 |
| 6,668,111 B2 | 12/2003 | Tapalian et al. | |
| 6,690,871 B2 | 2/2004 | Lee et al. | |

(Continued)

FOREIGN PATENT DOCUMENTS

EP    0646832 A2    4/1995

(Continued)

OTHER PUBLICATIONS

DeVaux et al. "High-Speed Tandem of MQW Modulators for Coded Pulse Generation With 14-DB Fiber-to-Fiber Gain," 8 IEEE Photonics Tech. Lett. 2, Feb. 1996, pp. 218-220.

(Continued)

*Primary Examiner* — Michelle R Connelly
(74) *Attorney, Agent, or Firm* — Goodwin Procter LLP

(57) ABSTRACT

Disclosed are optical modulators that have two coupling paths or structures between an input port to an output port, at least one of which includes an optical resonator.

17 Claims, 17 Drawing Sheets

U.S. PATENT DOCUMENTS

| | | | |
|---|---|---|---|
| 6,711,200 B1 | 3/2004 | Scherer et al. | |
| 6,829,269 B2 | 12/2004 | Goodhue et al. | |
| 6,834,141 B1* | 12/2004 | Sidick | 385/27 |
| 6,839,482 B2 | 1/2005 | Margalit | |
| 6,847,750 B1 | 1/2005 | Baumann et al. | |
| 6,891,996 B2 | 5/2005 | Sercel et al. | |
| 6,947,632 B2 | 9/2005 | Fischer | |
| 7,062,126 B2 | 6/2006 | Kersey et al. | |
| 7,102,469 B2 | 9/2006 | Kim et al. | |
| 7,110,632 B2 | 9/2006 | Abeles | |
| 7,123,800 B2 | 10/2006 | Kaplan | |
| 7,145,660 B2 | 12/2006 | Margalit et al. | |
| 7,149,378 B2 | 12/2006 | Baumann et al. | |
| 7,164,838 B2 | 1/2007 | Blauvelt et al. | |
| 7,200,308 B2 | 4/2007 | Hochberg et al. | |
| 7,215,848 B2 | 5/2007 | Tan et al. | |
| 7,292,751 B2 | 11/2007 | Popovic | |
| 7,339,724 B2 | 3/2008 | Hochberg et al. | |
| 7,424,192 B2 | 9/2008 | Hochberg et al. | |
| 7,446,880 B2 | 11/2008 | Vollmer et al. | |
| 7,450,811 B2 | 11/2008 | Hashimoto | |
| 7,539,375 B2* | 5/2009 | Popovic | 385/32 |
| 7,583,874 B2 | 9/2009 | Rakich et al. | |
| 7,643,714 B2 | 1/2010 | Hochberg et al. | |
| 7,693,369 B2 | 4/2010 | Fan et al. | |
| 7,853,108 B2 | 12/2010 | Popovic et al. | |
| 7,903,909 B2 | 3/2011 | Popovic | |
| 7,920,770 B2 | 4/2011 | Holzwarth et al. | |
| 7,973,265 B2 | 7/2011 | Chu et al. | |
| 8,019,185 B2* | 9/2011 | Yap | 385/3 |
| 8,032,027 B2* | 10/2011 | Popovic | 398/82 |
| 2001/0040681 A1* | 11/2001 | Paiam et al. | 356/480 |
| 2001/0046344 A1 | 11/2001 | Hayashi et al. | |
| 2002/0039470 A1 | 4/2002 | Braun et al. | |
| 2002/0067540 A1 | 6/2002 | Delprat et al. | |
| 2002/0076149 A1 | 6/2002 | Deacon | |
| 2002/0076188 A1 | 6/2002 | Kimerling et al. | |
| 2002/0081055 A1 | 6/2002 | Painter et al. | |
| 2002/0122648 A1 | 9/2002 | Mule' et al. | |
| 2002/0136481 A1 | 9/2002 | Mule' et al. | |
| 2002/0172466 A1 | 11/2002 | Baumann et al. | |
| 2002/0181829 A1 | 12/2002 | Margalit et al. | |
| 2003/0015770 A1 | 1/2003 | Talin et al. | |
| 2003/0016907 A1 | 1/2003 | LoCascio et al. | |
| 2003/0021301 A1 | 1/2003 | Vahala et al. | |
| 2003/0128922 A1 | 7/2003 | Kolodziejski et al. | |
| 2003/0138178 A1 | 7/2003 | Kimerling et al. | |
| 2003/0156780 A1 | 8/2003 | Margalit et al. | |
| 2003/0174974 A1 | 9/2003 | Yasuda et al. | |
| 2003/0210860 A1 | 11/2003 | Margalit | |
| 2003/0219052 A1 | 11/2003 | Goodhue et al. | |
| 2004/0008942 A1 | 1/2004 | Scheuer et al. | |
| 2004/0008968 A1 | 1/2004 | Lee et al. | |
| 2004/0013355 A1 | 1/2004 | Margalit | |
| 2004/0042726 A1 | 3/2004 | Kersey et al. | |
| 2004/0056243 A1 | 3/2004 | Atanackovic et al. | |
| 2004/0114899 A1 | 6/2004 | Mattsson | |
| 2004/0146431 A1 | 7/2004 | Scherer et al. | |
| 2004/0156580 A1 | 8/2004 | Baumann et al. | |
| 2004/0161188 A1* | 8/2004 | Su et al. | 385/24 |
| 2004/0197051 A1 | 10/2004 | Sercel et al. | |
| 2004/0264905 A1 | 12/2004 | Blauvelt et al. | |
| 2005/0029536 A1 | 2/2005 | Sugitatsu et al. | |
| 2005/0036737 A1 | 2/2005 | Stuart | |
| 2005/0068602 A1 | 3/2005 | Tormen et al. | |
| 2005/0077526 A1 | 4/2005 | Shin et al. | |
| 2005/0147348 A1 | 7/2005 | Grunnet-Jepsen et al. | |
| 2005/0163418 A1 | 7/2005 | Wong et al. | |
| 2005/0169566 A1 | 8/2005 | Takahashi | |
| 2005/0196103 A1 | 9/2005 | Kaplan | |
| 2005/0255619 A1 | 11/2005 | Negro et al. | |
| 2005/0259937 A1 | 11/2005 | Whaley et al. | |
| 2005/0275921 A1 | 12/2005 | Haus et al. | |
| 2006/0008272 A1 | 1/2006 | Abeles | |
| 2006/0029325 A1 | 2/2006 | Fardi et al. | |
| 2006/0034569 A1 | 2/2006 | Shih et al. | |
| 2006/0083456 A1 | 4/2006 | Burns et al. | |
| 2006/0134535 A1 | 6/2006 | Porque | |
| 2006/0198566 A1 | 9/2006 | Watts | |
| 2006/0222038 A1 | 10/2006 | Yamazaki | |
| 2006/0227331 A1 | 10/2006 | Vollmer et al. | |
| 2006/0239614 A1 | 10/2006 | Montgomery et al. | |
| 2006/0274995 A1 | 12/2006 | Lee et al. | |
| 2006/0291791 A1 | 12/2006 | Hochberg et al. | |
| 2007/0035800 A1 | 2/2007 | Hochberg et al. | |
| 2007/0133934 A1 | 6/2007 | Blauvelt et al. | |
| 2007/0211992 A1 | 9/2007 | chu et al. | |
| 2007/0230867 A1 | 10/2007 | Chen et al. | |
| 2007/0237460 A1 | 10/2007 | Fan et al. | |
| 2007/0253663 A1 | 11/2007 | Keyser et al. | |
| 2008/0002992 A1 | 1/2008 | Hochberg et al. | |
| 2008/0007817 A1 | 1/2008 | Hochberg et al. | |
| 2008/0013876 A1 | 1/2008 | Gill et al. | |
| 2008/0014534 A1 | 1/2008 | Barwicz et al. | |
| 2008/0044184 A1 | 2/2008 | Popovic | |
| 2008/0166095 A1 | 7/2008 | Popovic et al. | |
| 2008/0199123 A1 | 8/2008 | Pan et al. | |
| 2008/0266639 A1 | 10/2008 | Melloni et al. | |
| 2008/0273835 A1 | 11/2008 | Popovic | |
| 2009/0022445 A1 | 1/2009 | Hochberg et al. | |
| 2009/0028492 A1 | 1/2009 | Wu et al. | |
| 2009/0028567 A1 | 1/2009 | Socci et al. | |
| 2009/0032805 A1 | 2/2009 | Ty Tan et al. | |
| 2009/0087137 A1 | 4/2009 | Doan | |
| 2009/0116788 A1 | 5/2009 | Rakich et al. | |
| 2009/0142019 A1 | 6/2009 | Popovic | |
| 2009/0220228 A1* | 9/2009 | Popovic | 398/48 |
| 2009/0239323 A1 | 9/2009 | Tan et al. | |
| 2009/0256136 A1 | 10/2009 | Tan et al. | |
| 2009/0274418 A1 | 11/2009 | Holzwarth et al. | |
| 2009/0290835 A1 | 11/2009 | Popovic | |
| 2009/0314763 A1 | 12/2009 | Chu et al. | |
| 2010/0002994 A1 | 1/2010 | Baehr-Jones et al. | |
| 2010/0209038 A1* | 8/2010 | Popovic et al. | 385/1 |
| 2011/0026879 A1 | 2/2011 | Popovic et al. | |
| 2011/0158584 A1 | 6/2011 | Popovic | |

FOREIGN PATENT DOCUMENTS

| | | | |
|---|---|---|---|
| EP | 0726627 | | 8/1996 |
| EP | 0909963 A1 | | 4/1999 |
| EP | 1024378 A2 | | 8/2000 |
| EP | 1241497 A2 | | 9/2002 |
| EP | 1717616 A1 | * | 11/2006 |
| EP | 1717616 A1 | | 11/2006 |
| EP | 1785771 A2 | | 5/2007 |
| JP | 2001-194160 A | | 7/2001 |
| WO | WO-8501123 A1 | | 3/1985 |
| WO | WO-0050938 A1 | | 8/2000 |
| WO | WO-0123955 A2 | | 4/2001 |
| WO | WO-0155814 A2 | | 8/2001 |
| WO | WO-0188580 A1 | | 11/2001 |
| WO | WO-01/96913 | | 12/2001 |
| WO | WO-0217004 | | 2/2002 |
| WO | WO-02063389 A1 | | 8/2002 |
| WO | WO-02/101421 A2 | | 12/2002 |
| WO | WO-03/043247 A2 | | 5/2003 |
| WO | WO-03036841 A1 | | 5/2003 |
| WO | WO-2005010618 A2 | | 2/2005 |
| WO | WO-2005/036793 | | 4/2005 |
| WO | WO-2005/106551 | | 11/2005 |
| WO | WO-2005104147 A2 | | 11/2005 |
| WO | WO-2006025760 A2 | | 3/2006 |
| WO | WO-2006/076585 A2 | | 7/2006 |
| WO | WO-2007/067165 | | 6/2007 |
| WO | WO-2007/084600 | | 7/2007 |
| WO | WO-2007/086888 | | 8/2007 |
| WO | WO-2008/005061 | | 1/2008 |
| WO | WO-2009/017769 | | 2/2009 |

OTHER PUBLICATIONS

Holzwarth et al. "Localized Substrate Removal Technique Enabling Strong-Confinement Microphotonics in Bulk Si CMOS Processes," CLEO/QELS, May 4-9, 2008, 2 pages.

Preston et al. "High-Speed All-Optical Modulation Using Polycrystalline Silicon Microring Resonators," Applied Physics Letters, vol. 92, No. 15, Apr. 15, 2008, pp. 151104, 3 pages.

International Search Report for PCT Application No. PCT/US2010/036630, mailed Sep. 15, 2010, 3 pages.
Written Opinion for PCT Application No. PCT/US2010/036630, mailed Sep. 15, 2010, 4 pages.
Altug et al., "Ultrafast Photonic Crystal Nanocavity Laser," Nature Physics 2 (2006) pp. 484-488.
Badolato et al., "Deterministic Coupling of Single Quantum Dots to Single Nanocavity Modes," Science 308 (2005) pp. 1158-1161.
Baehr-Jones et al., "High-Q Ring Resonators in Thin Silicon-on-Insulator," 85 Appl. Phys. Lett. 16 (Oct. 2004) pp. 3346-3347.
Barbarossa et al., "Novel Double-Ring Optical-Guided-Wave Vernier Resonator," 144 IEE Proc.-Optoelectron. 4, pp. 203-208 (Aug. 1997).
Barbarossa et al., "Theoretical Analysis of Triple-Coupler Ring-Based Optical Guided-Wave Resonator," 13 J. Lightwave Tech. 2, pp. 148-157 (Feb. 1995).
Barbarossa et al., "Triple-Coupler Ring-Based Optical Guided-Wave Resonator," 30 IEEE Electronics Lett. 2, pp. 131-133 (Jan. 20, 1994).
Barwicz et al., "Polarization-transparent microphotonic devices in the Strong Confinement Limit," Nature Photonics 1, pp. 57-60 (Jan. 2007).
Barwicz, "3D analysis of scattering losses due to sidewall roughness in microphotonic waveguides: high index-contrast," 2005 Conf. on Lasers and Electro-Optics (CLEO), vol. 2, pp. 1333-1335.
Batten et al., "Building Manycore Processor-to-DRAM Networks with Monolithic CMOS Si Photonics," IEEE Micro, p. 8-21 (Jul. 2009).
Becker et al., "Optical Properties of Semiconductors. III. Infra-red Transmission of Silicon," 76 Physical Rev. A, pp. 1531-1532 (1949).
Bethe, "Theory of Diffraction by Small Holes," 66 Phys. Rev. 7-8, pp. 163-182 (Oct. 1944).
Bogaerts et al., "Low-loss, low-cross-talk crossings for silicon-on-insulator nanophotonic waveguides," 32 Optics Letters 19, pp. 2801-2803 (2007).
Bozhevolnyi et al., "Channel Plasmon Subwavelength Waveguide Components Including Interferometers and Ring Resonators," Nature 440 (2006) pp. 508-511.
Bustillo et al., "Surface Micromachining for Microelectromechanical Systems," Proc. of the IEEE 86 (1998) pp. 1552-1574.
Campbell et al., "GaAs Electro-Optic Directional-coupler switch," 27 Applied Physics Lett. 4, pp. 202-205 (Aug. 1975).
Chan et al., "Single-mode and Polarization-independent Silicon-on-insulator waveguides with Small Cross Section," 23 J. Lightwave Tech. 6 (Jun. 2005) pp. 2103-2111.
Chen et al., "Low-loss multimode-interference-based crossings for Silicon Wire Waveguides," 18 IEEE Photonics Letters 21, pp. 2260-2262 (2006).
Chremmos et al., "Properties of Regular Polygons of Coupled Microring Resonators," 46 Applied Optics Optical Society of America 31, pp. 7730-7738 (Nov. 1, 2007).
Chuang, S.L., Physics of Optoelectronic Devices, (Wiley, NY, 1995).
Daldosso et al., "Comparison Among Various Si3N4 Waveguide Geometries Grown within a CMOS Fabrication Pilot Line," 22 J. Lightwave Tech. 7 (Jul. 2004) pp. 1734-1740.
Daldosso et al., "Fabrication and Optical Characterization of thin two-dimensional Si3N4 Waveguides," Mat. Sci. in Semicond. Proc. 7, (2004) pp. 453-458.
Darmawan et al., "Nested Ring Mach-Zender Interferometer," 15 Optics Express Opt. Soc. America 2, pp. 437-448 (Jan. 2001).
Doerr et al., "Wavelength Add-Drop Node Using Silica Waveguide Integration," 22 J. Lightwave Tech. 12, pp. 2755-2762 (Dec. 2004).
Domash et al., "Tunable and Switchable Multiple-Cavity Thin Film Filters," 22 J. Lightwave Tech. 1, pp. 126-135 (Jan. 2004).
Dumon et al., "Low-loss photonic wires and compact ring resonators in silicon-on-insulator," 5450 Proc. SPIE 1, pp. 360-368 (2004).
Eichenfield et al., "Actuation of Micro-optomechanical Systems via Cavity-enhanced Optical Dipole Forces," 1 Nature Photonics 7, pp. 416-422 (2007).
Espinola et al., "Fast and Low-Power Thermooptic Switch on Thin Silicon-on-Insulator," 15 IEEE Photon. Tech. Lett. 10, pp. 1366-1368 (2003).
Examination Report in European Patent Application No. 04786154.7, mailed Jul. 16, 2008.

Fan et al., "Theoretical Analysis of Channel Drop Tunneling Processes," 59 Phys. Rev. B 2, pp. 15882-15892 (Jun. 15, 1999).
Findakly et al., "On the Crosstalk of Reversed-$\Delta\beta$ Durectional Coupler Switches," 6 J. of Lightwave Tech. 1, pp. 36-40 (Jan. 1988).
Geuzebroek et al., "Thermally Tuneable, Wide FSR Switch based on Micro-ring Resonators," Proc. Symp. IEEE/LEOS Benelux Chapter, pp. 155-158 (2002).
Gheorma et al., IEEE Photon. Tech. Lett. 14, 795 (2002).
Goebuchi et al., "Fast and Stable Wavelength-Selective Switch Using Double-Series Coupled Dielectric Microring Resonator," 18 IEEE Photonics Tech. Lett. 3, pp. 538-540 (Feb. 1, 2006).
Green et al., Optics Express 15, 17106 (2007).
Green et al., Optics Express 15, 17264 (2007).
Gritsenko et al., "Short-range order in non-stoichiometric amorphous silicon oxynitride and silicon-rich nitride," 297 J. Non-Crystalline Solids 1, pp. 96-101 (Jan. 2002).
Gunn, "CMOS Photonics for High-Speed Interconnects," IEEE Micro 26 (2), pp. 58-66 (Mar./Apr. 2006).
Guo et al., "Characterization of Si3N4/SiO2 Planar Lightwave Circuits and Ring Resonators," Proc. of SPIE, vol. 5350 (2004) pp. 13-22.
Guo et al., "High-Q Microring Resonator for Biochemical Sensors," 5728 Proc. SPIE, pp. 83-92 (2005).
Gupta et al., Conf. on Lasers and Electro-Optics (CLEO), p. paper CTuNN5 (2008).
Haus et al., "Broadband Hitless Bypass Switch for Integrated Photonic Circuits," 18 IEEE Photonics Tech. Lett. 10, pp. 1137-1139 (May 15, 2006).
Haus et al., "Elimination of Cross Talk in Optical Directional Couplers," 46 Applied Physics Lett. 1, pp. 1-3 (Jan. 1, 1985).
Haus, H.A., Waves and Fields in Optoelectronics, (Prentice-Hall, Englewood Cliffs, NJ, 1984).
Holzwarth et al., "High Speed analog-to-digital conversion with silicon photonics," in Proc. SPIE 7220, 72200B (2009).
In et al., "Origami Fabrication of Nanostructured, Three-dimensional Devices: Electrochemical Capacitors with Carbon Electrodes," Appl. Phys. Lett. 88 (2006) 83104.
International Preliminary Report on Patentability and Written Opinion for PCT/US06/028848, mailed Feb. 7, 2008.
International Preliminary Report on Patentability for PCT/US2007/026513 dated Jul. 9, 2009.
International Preliminary Report on Patentability in International Patent Application No. PCT/US2008/003957, dated Sep. 29, 2009 (11 pages).
International Search Report & Written Opinion for International Patent Application No. PCT/US2007/018207, mailed Jul. 29, 2008 (13 pages).
International Search Report & Written Opinion for PCT/US2005/043762, mailed Jun. 19, 2008, 8 pages.
International Search Report & Written Opinion for PCT/US2007/015740, dated Feb. 18, 2008 (10 pages).
International Search Report & Written Opinion for PCT/US2007/026513, mailed Jun. 19, 2008.
International Search Report & Written Opinion for PCT/US2008/00330, mailed Oct. 14, 2008.
International Search Report & Written Opinion for PCT/US2008/082054, dated Mar. 18, 2009.
International Search Report & Written Opinion for PCT/US2009/041668, mailed Sep. 11, 2009 (14 pages).
International Search Report & Written Opinion for PCT/US2009/066537, mailed Apr. 16, 2010 (17 pages).
International Search Report and Written Opinion for PCT/US2007/026513 dated Dec. 28, 2007 (15 pages).
International Search Report and Written Opinion for PCT/US2008/080749 dated May 25, 2009 (19 pages).
International Search Report for PCT/US06/28848, mailed Feb. 16, 2007.
Jackson, J.D., Classical Electrodynamics (Wiley, NY, 1999).
Johnson et al., "Perturbation Theory for Maxwell's Equations with Shifting Boundaries," Phys. Rev. E, 65, 066611 (2002).
Kelly et al., "Monolithic Suspended Optical Waveguides for InP MEMS," 16 IEEE Photonics Tech. Letters 5, pp. 1298-1300 (2004).

Khan et al., "Mode-Coupling Analysis of Multipole Symmetric Resonant Add/Drop Filters," 35 IEEE J. of Quantum Elec. 10, pp. 1451-1460 (Oct. 1999).

Khurgin et al., "Expanding the Bandwidth of Slow-Light Photonic Devices Based on Coupled Resonators," 30 Optics Lett. 5, pp. 513-515 (Mar. 1, 2005).

Kippenberg et al., "Analysis of Radiation-pressure Induced Mechanical Oscillation of an Optical Microcavity," Phys. Rev. Lett. 95 (2005) 033901.

Kogelnik et al., "Switched Directional Couplers with Alternating $\Delta\beta$," QE-12 IEEE J. Quantum Elec. 7, pp. 396-401 (1976).

Korotky, "Three-Space Representation of Phase-Mismatch Switching in Coupled Two-State Optical System," QE-22 IEEE J. Quantum Elec. 6, pp. 952-958 (1986).

Lee et al., "MEMS-Actuated Microdisk Resonators with Variable Power Coupling Ratios," 17 IEEE Photonics Tech. Lett. 5, pp. 1034-1036 (May 2005).

Lee et al., "Tunable Coupling Regimes of Silicon Microdisk Resonators using MEMS Actuators," 14 Optics Express 11, pp. 4703-4712 (May 29, 2006).

Li et al., Optics Express 16, 13342 (2008).

Little et al., "Filter Synthesis for Periodically Coupled Microring Resonators," 25 Optics Lett. 5, pp. 344-346 (Mar. 1, 2000).

Little et al., "Microring Resonator Channel Dropping Filters," J. Lightwave Tech. 15, pp. 998-1005 (1997).

Little et al., "Very High-order Microring Resonator Filters for WDM Applications," 16 IEEE Photonics Tech. Lett. 10 (Oct. 2004) pp. 2263-2265.

Little et al., "Wavelength Switching and Routing using Absorption and Resonance," 10 IEEE Photonics Tech. Lett. 6, pp. 816-818 (Jun. 1998).

Liu et al., "Low-loss waveguide crossing using a multimode interference structure," 241 Optics Communications 1-3, pp. 99-104 (2004).

Maboudian et al., "Critical Review: Adhesion in Surface Micromechanical Structures," J. Vac. Sci. Tech. B, 15 (1997).

Madsen et al., "A Multi-Port Add/Drop Router using UV-induced Gratings in Planar Waveguides," Lucent Technologies, pp. 104-106 (Feb. 1999).

Madsen et al., "Hitless Reconfigurable Add/Drop Multiplexers using Bragg Gratings in Planar Waveguides," OSA TOPS, v. 29, WDM Components, pp. 54-60.

Madsen et al., Optical Filter Design and Analysis: A Signal Processing Approach, (Wiley, NY, 1999).

Madsen, "Efficient Architectures for Exactly Realizing Optical Filters with Optimum Bandpass Designs," 10 IEEE Photonics Tech. Lett. 8, pp. 1136-1138 (Aug. 1998).

Manolatou et al., "Coupling of Modes Analysis of Resonant Channel Add-Drop Filters," 35 IEEE J. of Quantum Elec. 9, pp. 1322-1331 (Sep. 1999).

Manolatou et al., "High-Density Integrated Optics," 17 J. Lightwave Tech. 9, pp. 1682-1692 (Sep. 1999).

McDonald, "Electric and Magnetic Coupling through Small Apertures in Shield Walls of any Thickness," MTT-20 IEEE Trans. on Microwave Theory & Techniques 10, pp. 689-695 (Oct. 1972).

Melchiorri et al., "Propogation Losses of Silicon Nitride Waveguides in the Near Infrared Range," Appl. Phys. Lett. 86, 121111 (2005).

Melloni et al., "Synthesis of Direct-Coupled-Resonators Bandpass Filters for WDM Systems Lightwave Technology," 20 J. Lightwave Tech. 2, pp. 296-303 (2002).

Melloni et al., Integr. Photon. Research and Applications/Nanophotonics (IPNRA), p. paper IMC1 (2006).

Mizrahi et al., "Mirror Manipulation by Attractive and Repulsive Forces of Guided Waves," Opt. Express 13 (2005) pp. 9804-9811.

Mizrahi et al., "Two Slab Optical Spring," Optics Lett. 32 (2007) pp. 692-694.

Nichol et al., "Thin Membrane Self-alignment using Nanomagnets for Three-dimensional Nanomanufacturing," J. Vac. Sci. Tech B (Microelectronics & Nanometer Structures) 24 (2006) pp. 3128-3132.

Nichols et al., "A Preliminary Communication on the Pressure of Heat and Light Radiation," Phys. Rev. 13 (1901) pp. 307-320.

Nielson et al., "Integrated Wavelength-selective Optical MEMS Switching using Ring Resonator Filters," IEEE Photonics Tech. Lett. 17 (2005) pp. 1190-1192.

Nielson, G.N., "Micro-opto-mechanical Switching and Tuning for Integrated Optical Systems," Ph.D. Thesis, Massachusetts Institute of Technology (2004).

Notomi et al., "Optomechanical Wavelength and Energy Conversion in High-Q Double-layer Cavities of Photonic Crystal Slabs," Phys. Rev. Lett. 97 (2006) 023903.

Oda et al., "A Wide-FSR Waveguide Double-Ring Resonator for Optical FDM Transmission Systems," 9 J. Lightwave Tech. 6, pp. 728-36 (1991).

Okamoto, K., Fundamentals of Optical Waveguides, (Elsevier Academic Press, MA, 2006).

Papuchon et al., "Electrically switched Optical Directional Coupler: Cobra," 27 Applied Physics Lett. 5, pp. 289-291 (Sep. 1, 1975).

Partial International Search Report for International Application No. PCT/US2007/018207, mailed Jun. 2, 2008 (5 pages).

Partial International Search Report for International Application No. PCT/US2008/00330, mailed Jul. 30, 2008 (5 pages).

Partial International Search Report for International Application No. PCT/US2008/003957, mailed Jun. 16, 2008 (8 pages).

Partial International Search Report for International Application No. PCT/US2008/080749, mailed Mar. 24, 2009.

Philipp et al., "Amorphous Silicon Rich Silicon Nitride Optical Waveguides for High Density Integrated Optics," 40 IEEE Electronics Letters 7, pp. 419-420. (Apr. 2004).

Poon et al., "Wavelength-selective reflector based on a circular array of coupled microring resonators," 16 IEEE Photonics Technology Letters 5, pp. 1331-1333 (May 2004).

Popovic et al., "General Approach to Hitless Switching and FSR Extension Resonators in Integrated Photonic Circuits," 2006 IEEE Optical Fiber Communication Conference and National Fiber Optic Engineers Conference (3 pages).

Popovic et al., "High-index-contrast, Wide-FSR Microring-Resonator Filter Design and Realization with Frequency-shift Compensation," in Optical Fiber Communication Conf., Tech. Dig. (2005) Paper OFK1, vol. 5, pp. 213-215.

Popovic et al., "Multistage High-Order Microring-Resonator add-drop Filters," 31 Optics Lett. 17 (Sep. 2006) pp. 2571-2573.

Popovic et al., Optics Express 14, 1208 (2006).

Popovic, "Air Trenches for Dense Silica Integrated Optics," MS Thesis, Massachusetts Institute of Technology, Dept. of Electrical Engineering & Computer Science, Feb. 2002, p. 53.

Popovic, "Optimally efficient resonance-tuned optical modulators," in CLEO 2009, paper CTuV6 (2 pages) (May 2009).

Popovic, Resonant optical modulators beyond conventional energy-efficiency and modulation frequency limitations.

Popovic, "Theory and Design of High-Index-Contrast Microphotonic Circuits," Ph.D. Thesis, Massachusetts Institute of Technology, Dept. of Electrical Engineering & Computer Science, Feb. 2008.

Popovic, M., "Complex-frequency Leaky Mode Computations using PML Boundary Layers for Dielectric Resonant Structures," Proc. of Integ. Photonics Res. (Jun. 2003).

Povinelli et al., "Enhancement mechanisms for optical forces in integrated optics," 6326 Proc. of SPIE Optical Trapping & Optical Manip. III 15, (2006).

Povinelli et al., "Evanescent-wave Bonding Between Optical Waveguides," Optics Lett. 30 (2005) pp. 3042-3044.

Povinelli et al., "High-Q Enhancement of Attractive and Repulsive Optical Forces between Coupled Whispering-gallery-mode Resonators," Opt. Express 13 (2005) pp. 8286-8295.

Qi et al., "A Three-dimensional Optical Photonic Crystal with Designed Point Defects," Nature 429 (2004) pp. 538-542.

Rabiei et al., "Polymer Micro-Ring Filters and Modulators," J. Lightwave Tech. 20, 1968 (2002).

Rakich et al., "Achieving Centimeter-scale supercollimation in a Large-area Two-dimensional Photonic Crystal," Nature Materials 5 (2006) pp. 93-96.

Rakich et al., "Cavity-Trapping via Optical-forces in Integrated Photonics," Massachusetts Institute of Technology.

Rakich et al., "Trapping, corraling and spectral bonding of optical resonances through optically induced potentials," 1 Nature Photonics 11, pp. 658-665 (2007).

Rakich et al., "Ultrawide Tuning of Photonic Microcavities via Evanescent Field Perturbation," Optics Lett. 31 (2006) pp. 1241-1243.

Rezzonico et al., Optics Express 16, 613 (2008).

Rhodes, "A Low-Pass Filter Prototype Network for Microwave Linear Phase Filters," MTT-18 IEEE Trans. Microwave Theory Tech. 6, pp. 290-301 (Jun. 1970).

Sacher et al., Optics Express 16, 15741 (2008).

Sarid, D., Scanning Force Microscopy with Applications to Electric, Magnetic, and Atomi Forces, (Oxford University Press, NY, 1994).

Saynatjoki et al., "High-index-contrast Optical Waveguides on Silicon," ICPS-27, 2 pages (2005).

Scotti et al., "A Hitless Reconfigureable Add-Drop Multiplexer of WDM Networks Utilizing Planar Waveguides, Thermo-Optic Switches and UV-Induced Gratings," OFC Tech. Dig., pp. 142-143 (Feb. 1998).

Song et al., "Ultra-high-Q Photonic Double-heterostructure Nanocavity," Nature Materials 4 (2005) pp. 207-210.

Spector et al., "Hybrid multi-mode/single-mode Waveguides for Low Loss," Massachusetts Institute of Technology, OAA/IPR, 3 pages (2004).

Srinivasan et al., "Alkyltrichlorosilane-based Self-assembled Monolayer Films for Stiction Reduction in Silicon Micromachines," J. of Microelectromechanical Sys. 7 (1998) pp. 252-260.

Sugimoto et al., "Waveguide polarization-independent Optical Circulator," 11 IEEE Photon. Tech. Lett. 3, pp. 355-357 (Mar. 1999).

Suh et al., "Temporal Coupled-Mode Theory and the Presence of Non-Orthogonal Modes in Lossless Multimode Cavities," 40 IEEE J. of Quantum Elec. 10, pp. 1511-1518 (Oct. 2004).

Takahashi et al., "Tunable Chromatic Dispersion Compensator Utilizing Silica Waveguide Ring Resonator having Mach-Zehnder Interferometric Variable Coupler Eliminating Crossing Point of Waveguides," 15th Annual Meeting of IEEE Lasers and Electro-Optics Society, v.2, pp. 665-666 (Nov. 10-14, 2002).

Tang et al., Highly efficient optical phase modulator in SOI waveguides, 31 Electronics Letters 6, pp. 451-452 (1995).

Tormen, "Passive Optical Integrated Components for Telecommunication," Thesis, Universite De Nice-Sophia Antipolis (2003) 196 pages.

Van Spengen et al., "A Physical Model to Predict Stiction in MEMS," J. of Micromechanics & Microengineering 12 (2002) pp. 702-713.

Watts et al., "Maximally Confined Silicon Microphotonic Modulators and Switches," IEEE Proc. of the LEOS Ann. Meet., p paper WF1, pp. 457-458 (2008).

Weber et al., "Crosstalk and Switching Characteristics in Directional Couplers," 24 IEEE J. of Quantum Elect. 3, pp. 537-548 (Mar. 1988).

Wei et al., "Compound Ring Resonator with Double Couplers," 186 Optics Communications 4-6, pp. 283-290 (Dec. 15, 2000).

Williamson, "Sensitivity-bandwidth product for electro-optic modulators," Optics Letters 26, 1362 (2001).

Xu et al., "Experimental Realization of an on-Chip All-Optical Analogue to Electromagnetically Induced Transparency," Phys. Rev. Lett. 96, pp. 1-4 (2006).

Xu et al., "Micrometre-scale silicon electro-optic modulator," Nature, vol. 435, pp. 325-327 (2005).

Yanagase et al., "Box-Like Filter Response and Expansion of FSR by a Vertically Triple Coupled Microring Resonator Filter," 20 J. Lightwave Tech. 8, pp. 1525-1529 (2002).

Yanik et al., "Stopping Light All Optically," 92 Phy. Rev. Lett. 8, pp. 1-4 (Feb. 27, 2004).

Yariv et al., "Coupled-Resonator Optical Waveguide: a Proposal and Analysis," 24 Optics Lett. 11, pp. 711-713 (Jun. 1, 1999).

* cited by examiner

RESONANT OPTICAL MODULATORS

CROSS-REFERENCE TO RELATED APPLICATION

This application claims priority to and the benefit of U.S. Provisional Patent Application No. 61/119,622, filed Dec. 3, 2008, which is hereby incorporated herein by reference in its entirety.

STATEMENT REGARDING FEDERALLY SPONSORED RESEARCH OR DEVELOPMENT

This invention was made with government support under Contract No. W911NF-08-1-0362 awarded by the Army Research Office. The government has certain rights in this invention.

TECHNICAL FIELD

The present invention relates, in various embodiments, to optical modulators and, more particularly, to resonator-based modulators with improved transfer properties between input and output ports.

BACKGROUND

Optical intensity modulators are important devices for optical communication, i.e., for imparting information onto laser light. They typically have the ability to modulate the intensity of an incident narrow-line (continuous-wave) laser signal from close to 100% of its nominal maximum value to close to 0%. In wavelength-division-multiplexed (WDM) systems, a modulator is typically needed for each wavelength, so it is desirable to have wavelength-selective modulators that can be cascaded, such that each is able to modulate a select wavelength without affecting other wavelengths. Preferably, such modulators can be integrated on a chip in large numbers, to scale with large numbers of wavelengths used. Therefore, modulators should also be small and energy-efficient. Energy-efficiency is particularly important for on-chip optical interconnects for multi-core microprocessors, and for on-chip optical transmitters on microprocessors as part of either all-on-chip or part-on-chip/part-off-chip optical networks between processors and/or between processors and memory. Finally, there are applications where a modulator with two output ports is employed to provide the modulated output signal (e.g., 1000101) in one port, and the complementary signal (i.e., 0111010) in the other port.

In general, modulators are designed to: (i) maximize modulation speed; (ii) minimize the energy required to modulate; (iii) minimize the optical bandwidth occupied by the modulation in order to allow cascading of modulators without crosstalk and with minimal wavelength spacing; and (iv) minimize the driving signal (to avoid material breakdown or to be able to use typical voltage levels available with CMOS driving circuits, on the order of 1V to 5V), which simultaneously aids in minimizing the energy required to modulate. In general, there is a trade-off between achieving these goals—in particular (i) and (ii), usually referred to as the sensitivity-bandwidth trade-off. Achieving high-speed modulation calls for photon lifetimes shorter than the modulation period, and is associated with a broad modulation bandwidth requiring strong actuation signals (e.g., voltages or currents). On the other hand, high sensitivity of the modulation to the driving signal typically requires sharp amplitude changes within a narrow optical bandwidth range of the device. Then, weak spectral shifting in the spectral response caused by weak modulation may be sufficient to substantially shift the sharp spectral feature across the fixed-wavelength input wave. Consequently, there is a limit to simultaneously achieving high speed and high sensitivity.

Energy-efficient modulators may be optically resonant structures, such as silicon microring resonators coupled to a waveguide, or Mach-Zehnder interferometers assisted by a ring resonator in at least one of the interferometer arms. Such modulators have a number of drawbacks. Structures using a cavity coupled to a waveguide have a Lorentzian response, which means that even when they are loss-less, i.e., have 100% transmission on resonance to the drop port, they do not roll off to a full zero transmission off resonance. As a result, they typically require that the resonance be moved during modulation by more than one bandwidth in order to achieve practically low transmission (that gives large on-to-off contrast, i.e., extinction ratio), which is energetically costly. Further, the extinction ratio of these devices may deteriorate when loss is associated with the frequency shift during modulation. This is the case, for example, when modulation is achieved with carrier injection in silicon, i.e., using the carrier-plasma effect. Modulators using a ring-loaded Mach-Zehnder configuration have the drawback of using multiple 3 dB splitters, which typically cause substantial losses on resonance. This is because a 3 dB splitter is difficult to design and realize to be lossless, and, furthermore, symmetric splitters approaching 50%:50% splitting (3 dB) have higher losses in general than asymmetric splitters with weak splitting approaching 0%:100%. Namely, the loss is typically considerably smaller than the smaller of the two output fractions. Furthermore, such modulator devices may have 3 dB loss off resonance at all wavelengths and may, therefore, be unsuitable for direct cascading in a WDM system.

Accordingly, a need exists for an improved resonant optical modulator.

SUMMARY

The present invention provides, in various embodiments, resonator-based optical modulators that are designed to improve modulation performance parameters, such as, for example, modulation speed, sensitivity, and/or energy-efficiency, and/or allow for modulator cascading. In general, the modulators include a first waveguide providing an input port and a first output (or through) port, a second waveguide providing a second output (or drop) port, and two coupling structures between the two waveguides. One of the coupling structures is an "optically active resonator," which, for purposes of this disclosure, denotes an optical resonator having a variable resonance frequency and/or a variable absorption coefficient that facilitate continuous optical modulation of an input signal between a first modulation state and a second modulation state.

The modulation performance of the device may be improved or optimized by engineering the transfer functions between the input and output ports by exploiting various degrees of freedom of the device, such as design parameters of the two coupling structures (e.g., coupling strengths, resonance frequency or frequencies of the modulator, etc.) and/or of optional additional device components (e.g., phase shifts induced by optical phase shifters). For example, the transfer functions may be designed such that one of the output ports has a transmission zero at the signal wavelength in the first modulation state, and the other output port has a transmission zero at the signal wavelength in the second modulation state.

The waveguides and resonator are typically strong-confinement devices, i.e., structures capable of confining, and optionally enhancing, an optical-regime electromagnetic field within a space on the scale of a few wavelengths, preferably less than a wavelength, in at least one dimension, preferably in two or in all three dimensions (in an arbitrary coordinate system of choice). For example, a channel waveguide, as used in various embodiments, confines optical fields in two dimensions, and a cavity resonator confines optical fields in three dimensions. Strong confinement may be achieved using high index contrast between the confining structures and the surrounding material (e.g., air or cladding material). The optical regime, as used herein, denotes a range of frequencies larger than 1 THz (corresponding to wavelengths shorter than 300 μm in the THz-wave regime) and smaller than 3000 THz (corresponding to wavelengths longer than 100 nm in the UV regime).

In a first aspect, embodiments of an optical modulator in accordance with the invention feature first and second optical waveguides, the first waveguide including an input port and a through port and the second waveguide including a drop port; as well as an optical resonator and a coupling structure, both optically coupled to each of the two waveguides. In some embodiments, the optical resonator is located in a first layer of the modulator, and the waveguides and coupling structure are located in a second layer. A transfer function from the input port to the trough port may have a transmission zero at a frequency of the input signal in a first modulation state, and a transfer function from the input port to the drop port may have a transmission zero at the frequency of the input signal in a second modulation state.

The optical resonator may be optically active, and may include a microring resonator, a figure-eight resonator, a standing-wave cavity pair, and/or a photonic cavity pair. The coupling structure may include a directional coupler (which may couple, for example, between 13% and 87% of the input signal form the first to the second optical waveguide), a waveguide junction and/or multimode interference coupler joining the first and second waveguides, and/or a second optical resonator. In certain embodiments, the first optical resonator forms part of the coupling structure. In some embodiments, the first optical resonator and a second optical resonator that forms part of the coupling structure are each directly coupled to the first waveguide, and indirectly, via one or more additional optical resonators, to the second waveguide. The optical modulator may further include a phase shifter in one or each of the waveguides between the first optical resonator and the coupling structure, and the phase shifter(s) may induce a differential phase shift between the two waveguides. The differential phase shift may be substantially equal to the inverse tangent of a ratio of an absorption detuning to a frequency detuning associated with modulation from a first modulation state to a second modulation state.

In a second aspect, an optical modulator in accordance with various embodiments includes an optical input port for receiving an input signal, optical through and drop ports, and an optical resonator structure coupling the input port to the through port and the drop port, and is characterized by a transfer function from the input port to the through port having a transmission zero at a frequency of the input signal in a first modulation state and a transfer function from the input port to the drop port having a transmission zero at the signal frequency in a second modulation state. The modulation from the first state to the second state may be associated with a frequency detuning and an absorption detuning, and a differential phase shift between the through and drop ports may be substantially equal to the inverse tangent of the absorption detuning to the frequency detuning. In some embodiments, the optical resonator structure includes a plurality of optical resonators.

In a third aspect, the invention is directed to a wavelength-selective optical modulator which includes optical input and output ports, a first path connecting the input port to the output port and including at least two optical resonators, and a second path connecting the input port to the output port via a structure outside of the first path. In some embodiments, at least one of the optical resonators is modulated, and at least one of the optical resonators is passive. In certain embodiments, a transfer function from the input port to the output port has a first transmission zero at a complex-frequency detuning from a resonance of less than three 3 dB bandwidths and a second transmission zero at a complex-frequency detuning from the resonance of more than six 3 dB bandwidths.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

In general, the invention relates to optical intensity modulators. An optical modulator receives monochromatic light (typically, narrow-bandwidth laser light) at an input port, and provides intensity-modulated light at an output port. A variety of mechanisms may be employed to effect the intensity modulation. In resonant modulators, the laser light passes through a resonator structure whose resonance frequency and/or absorption properties are variable (i.e., an active resonator). For example, the electrooptic effect may used to vary refractive index, and hence the resonance frequency, of the resonator structure, which passes the laser light only when the resonance frequency substantially coincides with the laser frequency (i.e., when the resonance band and the laser line overlap), and blocks the laser light when the resonance frequency is detuned from the laser frequency. The absorption properties may be modulated using electroabsorption based on, for example, the Franz-Keldysh or quantum-confined Stark effect. Carrier injection in silicon structures may be employed to change both the refractive and the absorptive properties (i.e., the complex index) of the resonator structure.

Modulators in accordance with various embodiments include two waveguides coupled via a resonant path as well as via a direct, broadband path, as further described below. The first waveguide contains an input port and a through port, and the second waveguide contains a drop port. Light that enters through the input port results in two complementary intensity-modulated signals in the drop and through ports. The transmission of an input signal from the input port to the two output ports (also referred to as the amplitude responses) may be characterized with two transfer functions, each providing the fraction of incoming power that is transmitted at the respective port as a function of frequency detuning from the resonance frequency. The transfer function properties depend on various parameters associated with the coupling paths, such as, e.g., the resonance frequency of the resonant path, coupling strengths, losses, and/or phase shifts.

Figure 1A:
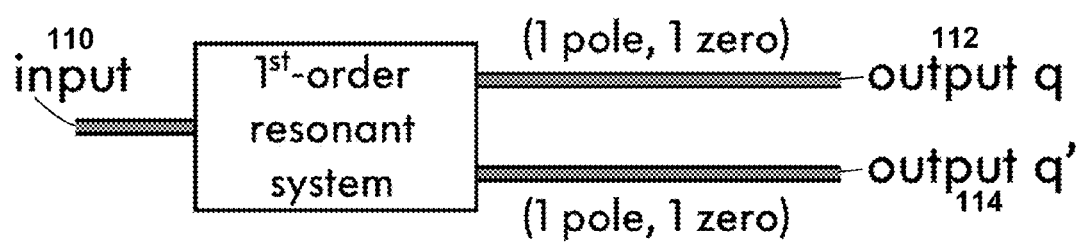
FIG. 1A is a drawing illustrating conceptually a first-order resonant modulator in accordance with various embodiments.
Figure 1B:
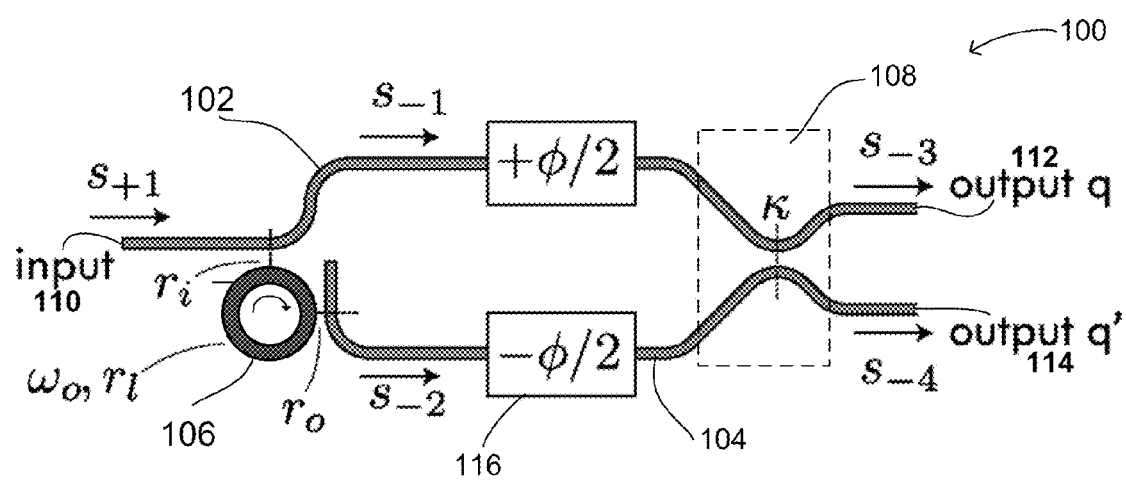
FIG. 1B is a drawing illustrating schematically an implementation of a first-order modulator including a microring resonator and directional coupler in accordance with one embodiment.

FIGS. 1A and 1B illustrate an exemplary single-resonance optical modulator device 100 in accordance with one embodiment. The modulator includes two waveguides 102, 104 coupled by an active optical resonator 106 such as, e.g., a microring resonator, and by a directional coupler 108 with coupling power ratio κ. One of the waveguides provides both the input port 110 and the through port 112 (labeled "output q"), and the other waveguide provides the drop port 114 (labeled "output q'"). The resonator 106 is characterized, absent modulation (i.e., in the "off" state), by a resonance frequency $\omega_0$ and a resonator decay rate $r_{total}=r_i+r_o+r_l$, wherein $r_i$ and $r_o$ are the decay rates due to coupling to the waveguides 102 and 104, respectively, and $r_l$ is the decay rate due to cavity losses (i.e., absorption of light in the resonator 106). The coupling rates $r_i$ and $r_o$ can be tuned by varying the distance between the resonator 106 and the waveguides 102, 104. Loss rate $r_l$ and resonance frequency $\omega_0$ are controllable through the selection of suitable materials and dimensions for the resonator. For example, the resonance frequency of a microring resonator is an inverse function of the ring radius. As illustrated, the modulator system 100 may also include phase shifters 116 (such as in one or both waveguides, which introduce a differential phase shift Φ between the through and drop ports 112, 114. Phase shifters may be implemented using, for example, waveguide sections where the phase shifts are effected through the thermo-optic effect—via the thermooptic coefficient of the waveguide core and/or cladding material(s)—by providing local heating, which may be accomplished by placing microheaters in proximity; waveguide sections comprising a p-i-n junction where phase shifts are created by generating a carrier plasma in the optical guiding region, e.g., via carrier injection or depletion; waveguide sections comprising an electrooptic material, such as a polymer, and actuated by forming an electric field in the waveguide region by application of a voltage across integrated electrodes; and/or resonators tuned near the wavelength of operation of the modulator, similarly using thermooptic, carrier plasma, or electrooptic effect applied to the resonant cavity. The parameters $\omega_0$, $r_i$, $r_o$, $r_l$, κ, and Φ can be chosen by design of the device 100 (within limits), and thus constitute six degrees of freedom that may be used to optimize the device.

Figure 2A:
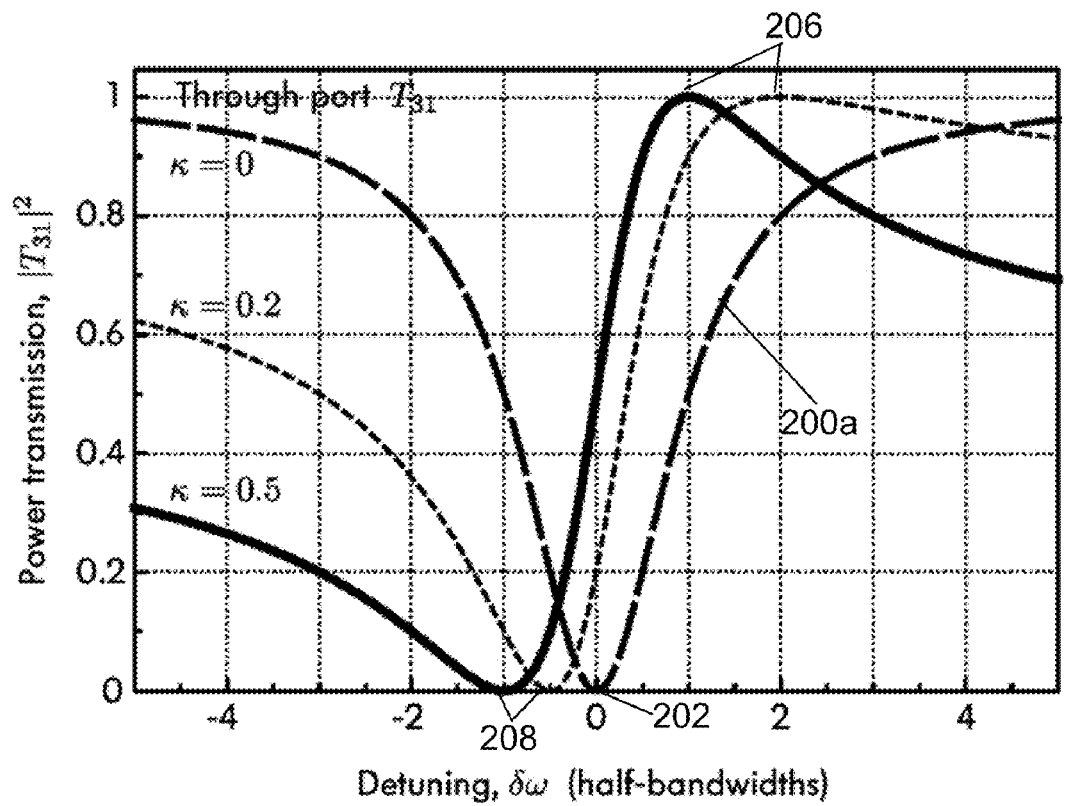
FIGS. 2A and 2B are graphs showing transfer functions of the modulator depicted in FIG. 1B in the through port and drop port, respectively, for several values of the coupling power ratio of the directional coupler in accordance with one embodiment.
Figure 2B:
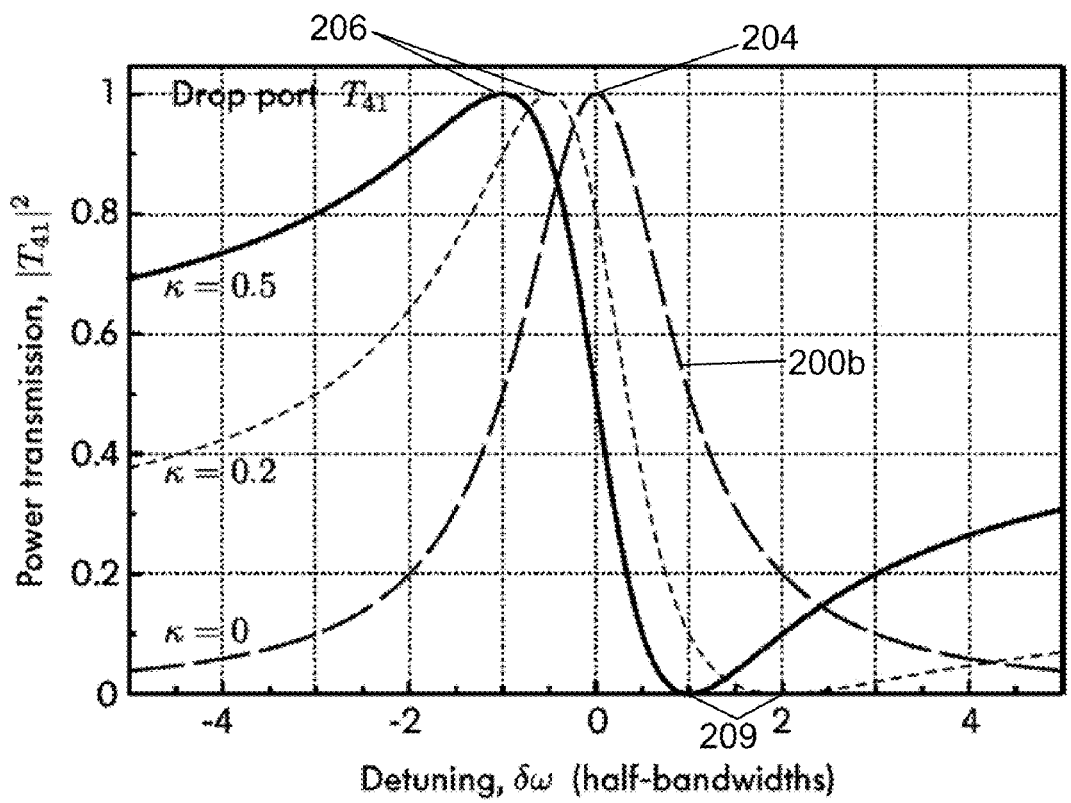

The transfer functions of the modulator device 100, which is conceptually illustrated in FIG. 1A, are shown FIGS. 2A and 2B for the loss-less case ($r_l=0$) for three values of the coupling power ratio κ. The power is split between the through and drop ports, whose corresponding transfer functions add up to 1 for all frequencies. (In the lossy case, i.e., for $r_l>0$, the sum of the transfer functions would be less than 1, and might vary with frequency.) For κ=0, the transfer functions 200a, 200b show a zero 202 in the power transmission to the through port, and a pole (i.e., local maximum 204) in the power transmission to the drop port at the resonance frequency (which corresponds to zero frequency detuning δω). For κ=0.2 and 0.5, the transfer functions of the through port and the drop port each include both a pole (near the maximum 206) and a transmission zero 208 or 209, respectively, at finite frequency detuning δω from resonance. This, in turn, allows full modulation between approximately 100% and 0% of the input signal amplitude in each port. In a first modulation state ("off"), a monochromatic input signal is transmitted to the through port (by 100% for loss-less systems), corresponding to a transmission zero in the drop port at the signal frequency. In a second modulation state ("on"), the spectral response of the device is shifted so that, at the signal frequency, the through port has a transmission zero, and the signal is transferred to the drop port.

The effect of the design parameter values on the transfer function properties can be calculated using coupled-mode theory in time (CMT), and making the assumption that the photon lifetime in the resonator is much longer than the center frequency optical period and the round-trip time and that the system is reflection-less (which is the case for a microring resonator). The transmission amplitudes in the through and drop ports are:

$$T_{through} = \frac{1}{j\delta w_o + r_{total}}\left[\sqrt{1-\kappa}\,(j\delta w_o + r_l + r_o - r_i)e^{+j\phi/2} + j\sqrt{\kappa}\,\mu_i\mu_o e^{-j\phi/2}\right]$$

$$T_{drop} = \frac{1}{j\delta w_o + r_{total}}\left[-j\sqrt{\kappa}\,(j\delta w_o + r_l + r_o - r_i)e^{+j\phi/2} - \sqrt{1-\kappa}\,\mu_i\mu_o e^{-j\phi/2}\right]$$

where $$\mu_i = \sqrt{2r_i} \text{ and } \mu_o = \sqrt{2r_o}.$$

The wavelength-dependent behavior of device 100 is determined by the pole and zero positions in the complex frequency plane. The pole associated with the response maximum 206, which is the same for the through port and the drop port, resides at the complex resonant frequency $\omega_p$ formed of the resonant frequency $\omega_0$ and the total photon decay rate $r_{total}$:

$$\omega_p = \omega_o + jr_{total}$$

The zeros 208 for the two response functions are, respectively:

$$\omega_{z,through} = \omega_o + j(r_l + r_o - r_i) + 2\sqrt{\frac{\kappa r_i r_o}{1-\kappa}}\,e^{-j\phi}e^{-j\pi}$$

$$\omega_{z,drop} = \omega_o j(r_l + r_o - r_i) + 2\sqrt{\frac{(1-\kappa)r_i r_o}{\kappa}}\,e^{-j\phi}$$

Figure 3:
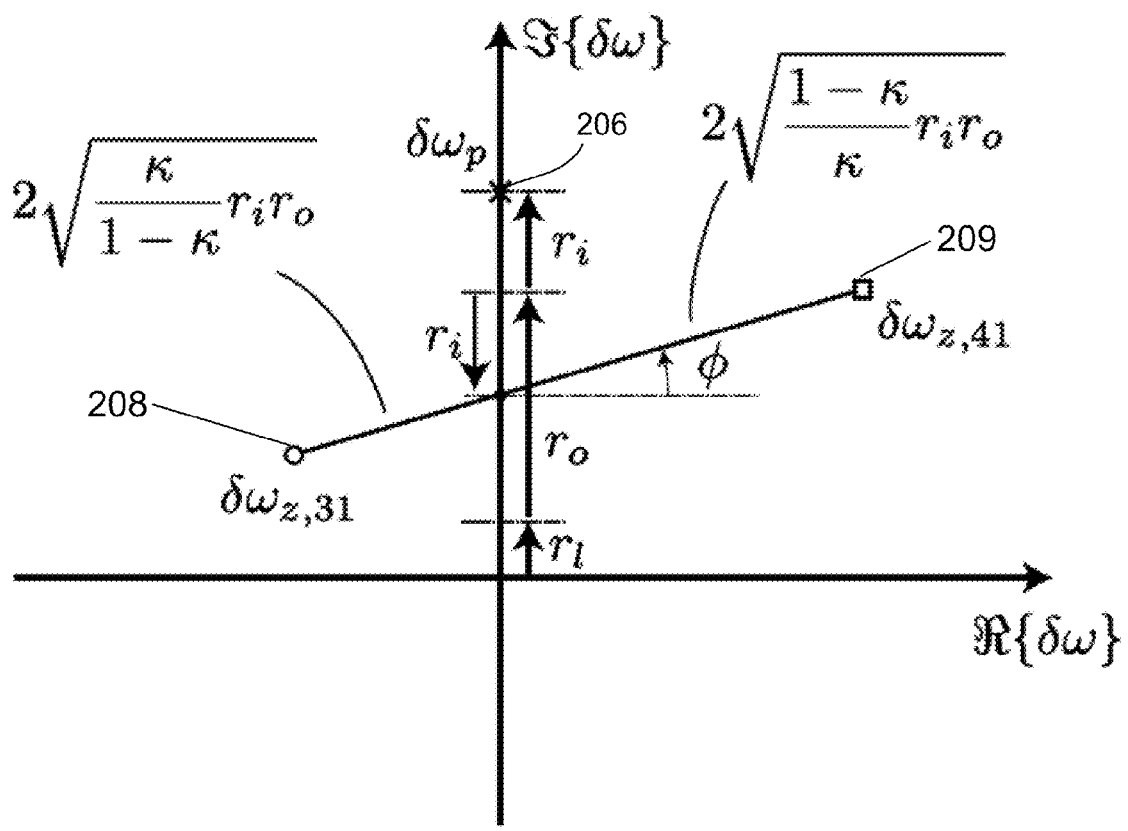
FIG. 3 is a pole-zero plot for a first-order resonant modulator in accordance with various embodiments.

FIG. 3 illustrates the pole 206 and zero 208, 209 positions geometrically in the complex plane with origin at the resonance frequency $\omega_0$ in the non-modulated ("off") state). Resonator loss $r_l$ pushes the pole 206 and zeros 208, 209 collectively up along the imaginary axis, and the differential phase Φ rotates the zeros 208, 209 in the complex plane about the point $\omega=\omega_0+j(r_l+r_o-r_i)$. In other words, the phase shift Φ corresponds to the orientation angle in the complex-frequency plane of a line connecting the transmission zeros 208, 209 (i.e., the slope of the line is the trigonometric tangent of Φ). When the resonance frequency of the device is modulated, the transfer functions, and thus the pole associated with the maximum 206 and zeros 208, 209, translate left or right. Therefore, in order to achieve a sharp transition in the amplitude response for refractive-index (loss-less) modulation, the design parameters may be selected such that both zeros fall on the real-frequency axis and the spacing between them is minimized.

Figure 4A:
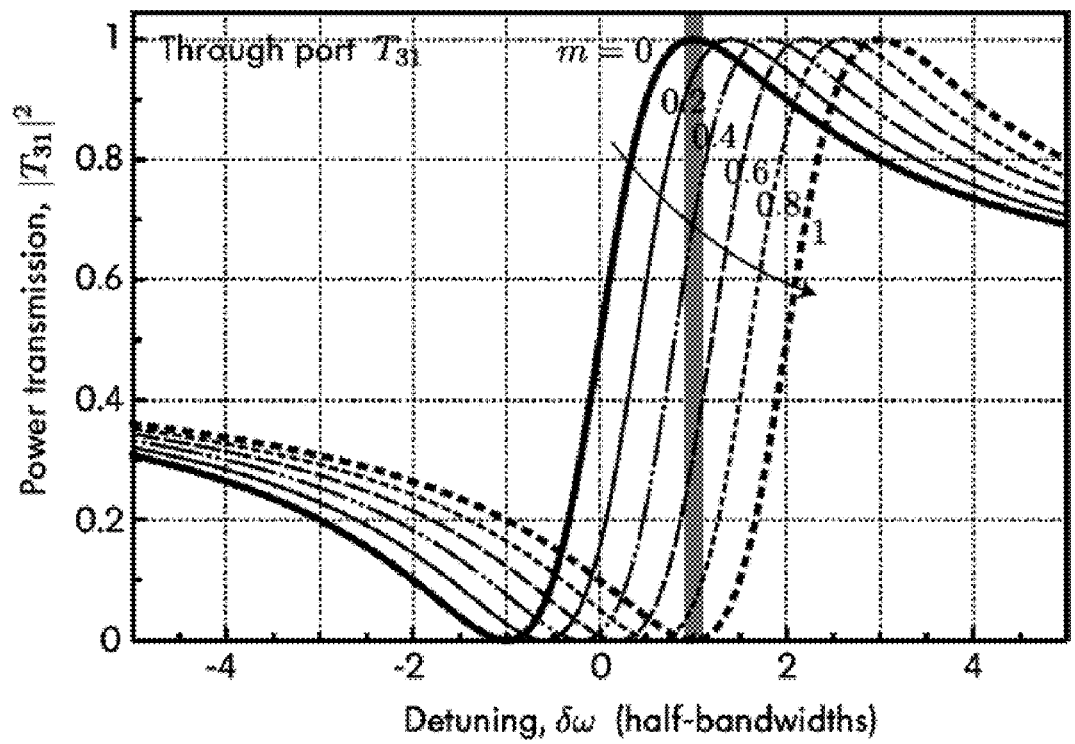
FIGS. 4A and 4B are graphs showing the transfer functions of the modulator depicted in FIG. 1B in the through port and drop port, respectively, for several levels of refractive-index modulation in accordance with one embodiment.
Figure 4B:
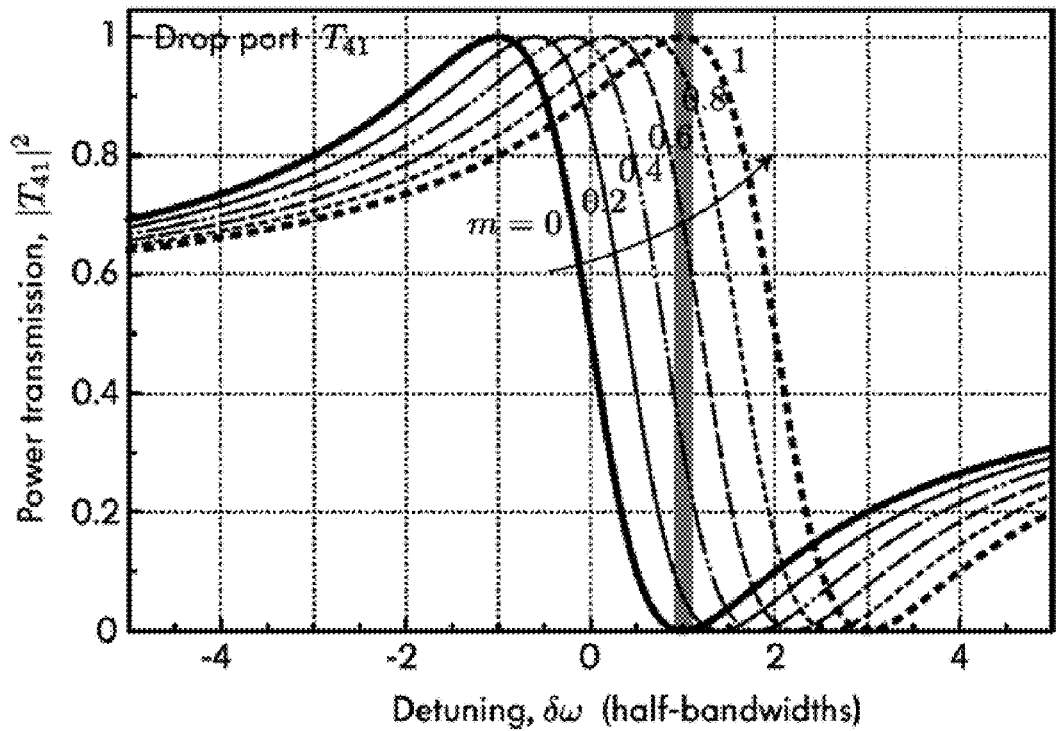
Figure 4C:
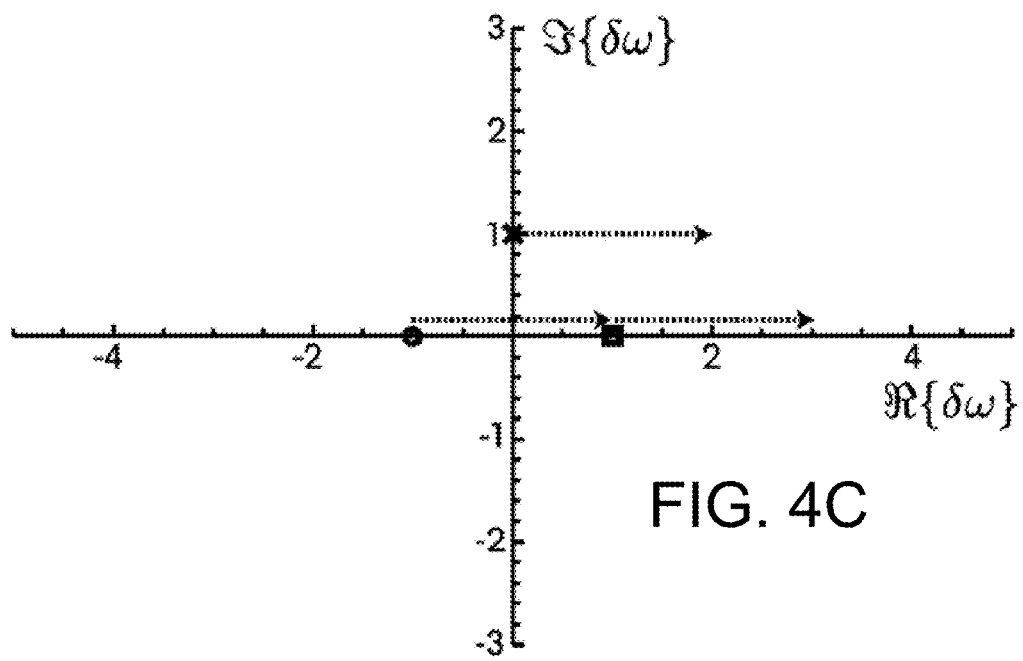
FIG. 4C is a pole-zero plot illustrating refractive-index modulation of the modulator depicted in FIG. 1B in accordance with one embodiment.
Figure 4D:
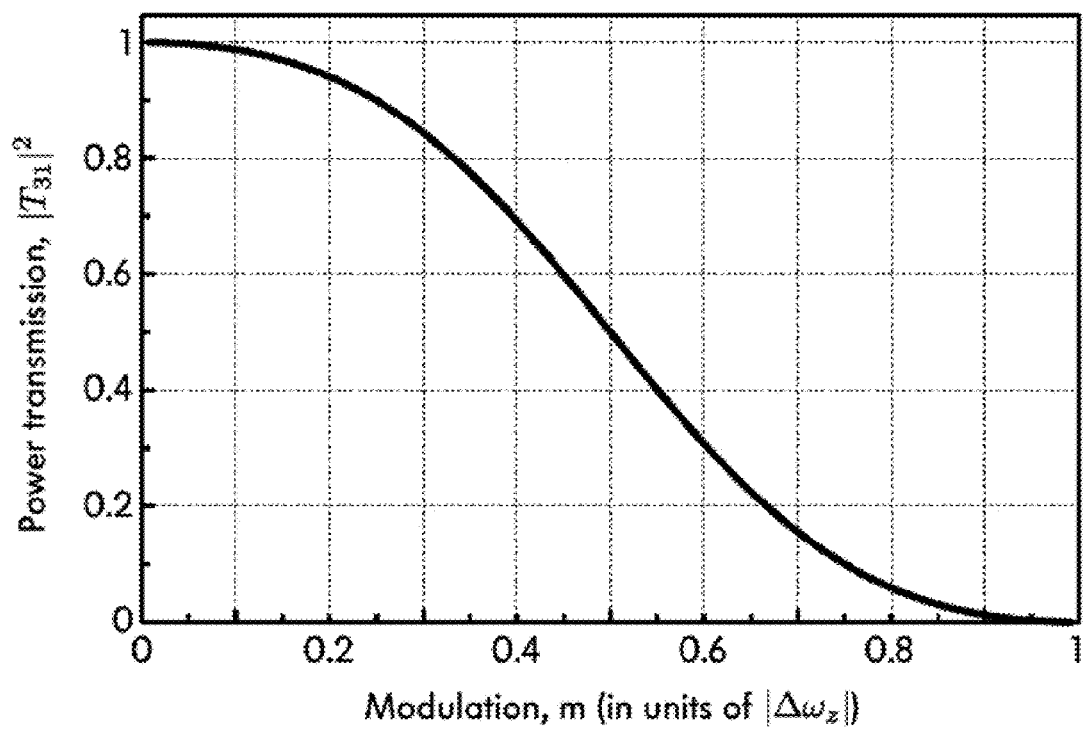
FIG. 4D is a graph illustrating the power transmission in the through port of the modulator depicted in FIG. 1B as a function of the level of refractive-index modulation in accordance with one embodiment.

To place both zeros on the real-frequency axis, the resonator loss and coupling rates may be chosen so that $r_i=r_o+r_l$, and the phase shift Φ set to zero (e.g., by not including phase shifters 116 in device 100). The transfer functions shown in FIGS. 2A-2B, for example, are computed using $r_i=r_o=0.5$, $r_l=0$, and Φ=0. The properties of a device having both zeros real in frequency are illustrated in FIGS. 4A-4D. FIG. 4A indicates the positions of the poles and zeros, and their direction of motion during modulation of the resonance frequency of the active optical resonator 206. The transfer functions for the through port and drop port are shown in FIGS. 4A and 4B, respectively, for various levels of modulation m between the off-state (m=0), corresponding to no modulation, and the on-state (m=1), corresponding to full modulation. The vertical shaded line indicates the input signal frequency. As can be seen, the input signal, which is placed at the position of the zero in the drop port, will see the full transmission in the drop port, corresponding to the zero in the through port, when the frequency shift due to modulation equals the spacing between the zeros. FIG. 4D shows the intensity in the through port over the full range of modulation levels m.

To enable large modulation in the signal strength with small actuation, small distances between the transmission zeros are advantageous because they result in short transitions between a full 100% and a 0% transmission in each port. Minimizing the spacing between the zeros for a fixed photon lifetime provides the greatest modulation efficiency for a given modulation speed. The distance $\Delta\omega_z$ between the transmission zeros 208 is a function of the coupling power ratio $\kappa$:

$$\Delta\omega_z = 2\sqrt{r_i r_o} \frac{1}{\sqrt{\kappa(1-\kappa)}} e^{-j\phi}.$$

Figure 5:
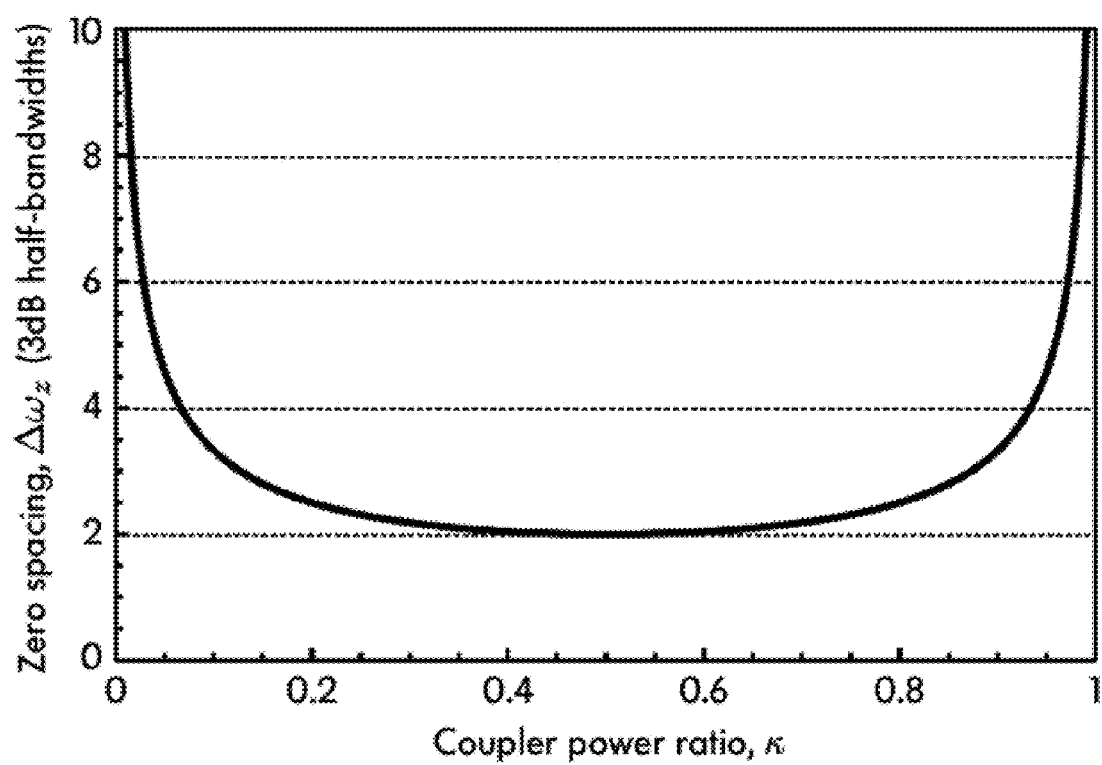
FIG. 5 is a graph illustrating transmission zero spacing as a function of coupling power ratio for the modulator depicted in FIG. 1B in accordance with one embodiment.

As illustrated in FIG. 5, it may be minimized by choosing $\kappa$ to fall in the range between approximately 5% and 95%, preferably between 13% and 87%, more preferably between 49% and 51%.

The modulator device 100 may also be used for small-signal modulation, i.e., intensity modulation of the output signal around a certain intensity value below 100% transmission by only a small fraction of that value. For small-signal modulation, only the slope of the transfer function at the selected intensity value matters, and is preferably maximized. This maximization occurs at $\kappa=\frac{1}{2}$. Thus, in preferred small-signal modulation embodiments, $\kappa$ is likewise chosen to fall in a range around 50% (e.g., between 5% and 95%, preferably between 13% and 87%, more preferably between 49% and 51%.)

Using loss-less modulation mechanisms, e.g., based on the linear electrooptic effect (which is used, e.g., in LiNbO$_3$) or the thermooptic effect (typically used in semiconductor- or polymer-core structure), the spectral response of the system (including the poles and transmission zeros depicted in FIG. 2) is shifted in frequency due to a change in the refractive index of the resonator. However, if lossy modulation, e.g., through carrier injection, is utilized, both the resonance frequency and the absorption of the resonator will change. As a result, in general, the poles and transmission zeros are shifted along both the real and imaginary axes. This situation is illustrated in FIGS. 6A-6D.

Figure 6A:
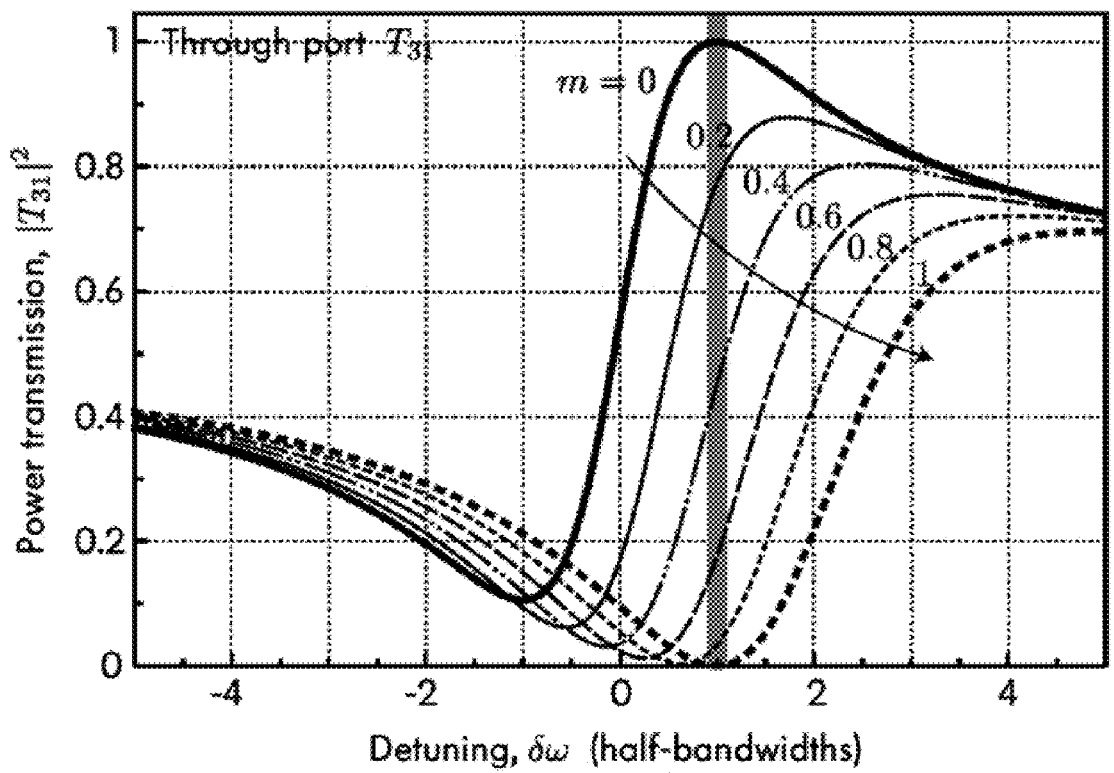
FIGS. 6A and 6B are graphs showing the transfer functions of the modulator depicted in FIG. 1B in the through port and drop port, respectively, for several levels of lossy modulation in accordance with one embodiment.
Figure 6B:
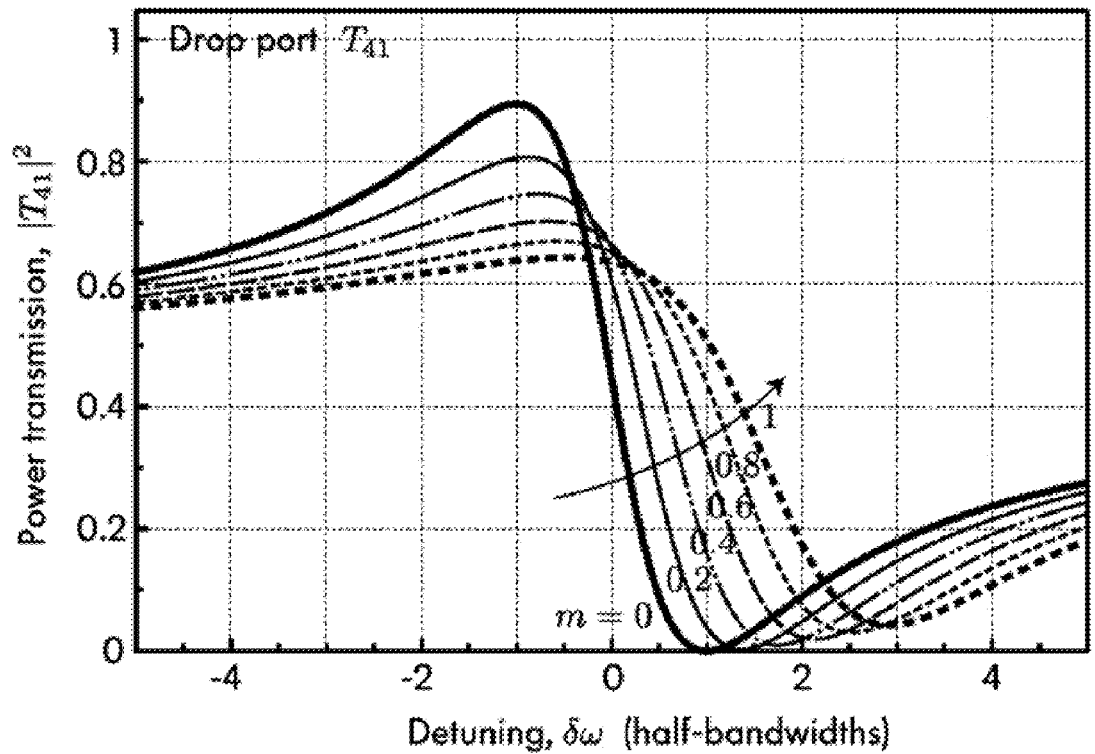
Figure 6C:
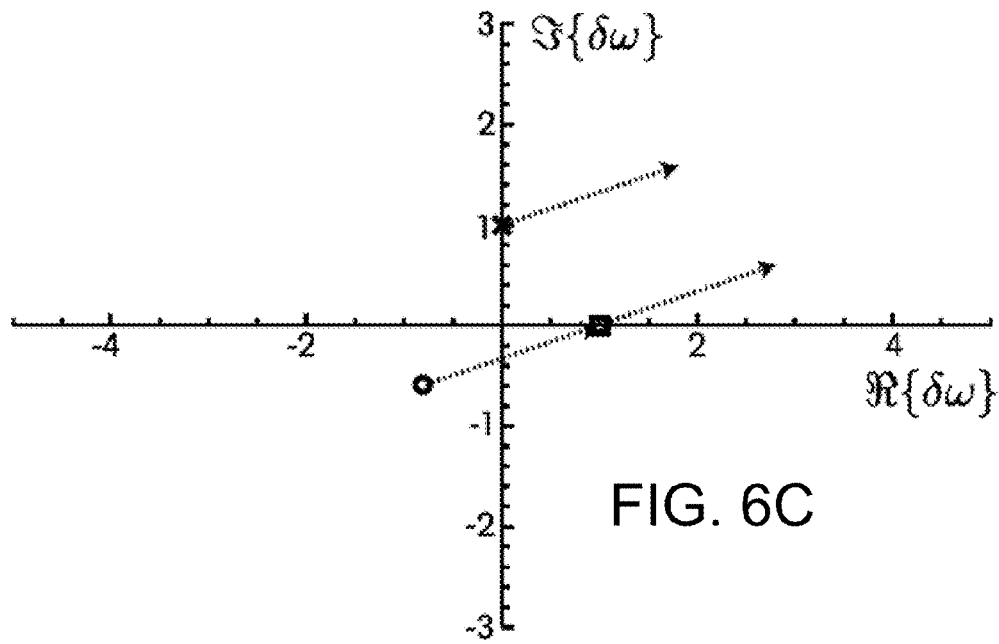
FIG. 6C is a pole-zero plot illustrating lossy modulation of the modulator depicted in FIG. 1B in accordance with one embodiment.
Figure 6D:
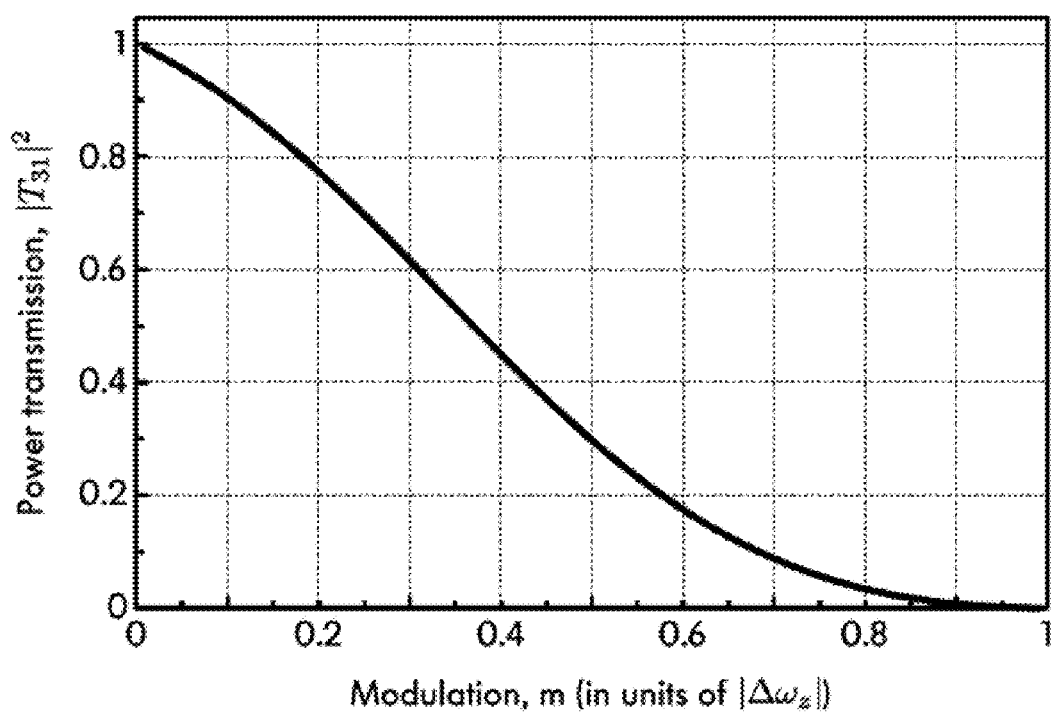
FIG. 6D is a graph illustrating the power transmission in the through port of the modulator depicted in FIG. 1B as a function of the level of lossy modulation in accordance with one embodiment.

As shown in FIGS. 6A and 6B, modulation results in this case not only in a shift of the transfer functions, but also in a decrease in their maxima. The sum of signal intensities in the through and drop ports decreases with increased modulation level, the remainder of the input signal frequency being lost in the modulation process. Assuming that the resonator 106 is lossless in the off-state, a large-signal modulation swing from 100% to 0% in the through port may nonetheless be achieved by designing the modulator such that the transmission zero in the drop port in the off-state lies on the real-frequency axis, and the phase shift $\Phi$ is equal to the modulation angle, whose tangent is the ratio of a change in resonator loss and a corresponding change in the resonance frequency due to modulation. In other words, with reference to FIG. 6C, the phase $\Phi$ is chosen such that modulation moves the zeros along the line that connects them in the complex frequency plane. Then, the through port has a transmission zero at real frequency in the shifted modulation state ("on").

The off-state zero may be placed on the real-frequency axis by choosing $r_i>0.5$ (corresponding to an over-coupled regime) and the coupling power ratio $\kappa$ such that, for $\Phi\geq 0$ (i.e., blue-shifting lossy modulation), $$\kappa = \frac{1}{1+\frac{(1-2r_i)^2}{4r_i(1-r_i-r_l)\sin^2\phi}}$$

and for $\Phi\leq 0$ (i.e., red-shifting lossy modulation), $$\kappa = \frac{1}{1+\frac{4r_i(1-r_i-r_l)\sin^2\phi}{(1-2r_i)^2}}.$$

The over-coupled regime compensates for the losses in the on-state, and brings the system back to the critical coupling condition.

The zero-spacing may be minimized, and thus the sensitivity of the modulator maximized, by selecting $r_i$ to be $$r_{i,opt} = \begin{cases} \frac{1}{2} + \frac{|\sin(2\phi)|}{4\cos^2\phi}, & |\phi|\leq\frac{\pi}{4} \text{ or } \frac{3\pi}{4}\leq|\phi|\leq\pi \\ 1, & \end{cases}$$

with corresponding coupler ratios $\kappa$ $$\kappa_{opt} = \begin{cases} 1 - \frac{1}{2}\sec^2\phi, & 0\leq\phi\leq\frac{\pi}{4}, \frac{3\pi}{4}\leq\phi\leq\pi \\ 0, & \frac{\pi}{4}\leq\phi\leq\frac{3\pi}{4} \\ \frac{1}{2}\sec^2\phi, & -\pi\leq\phi\leq-\frac{3\pi}{4}, -\frac{\pi}{4}\leq\phi\leq 0 \\ 1, & -\frac{3\pi}{4}\leq\phi\leq-\frac{\pi}{4}. \end{cases}$$

Figure 7A:
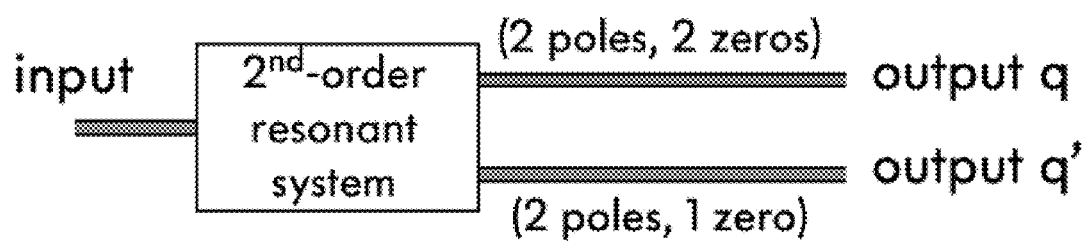
FIG. 7A is a drawing illustrating conceptually a second-order resonant modulator in accordance with various embodiments.
Figure 7B:
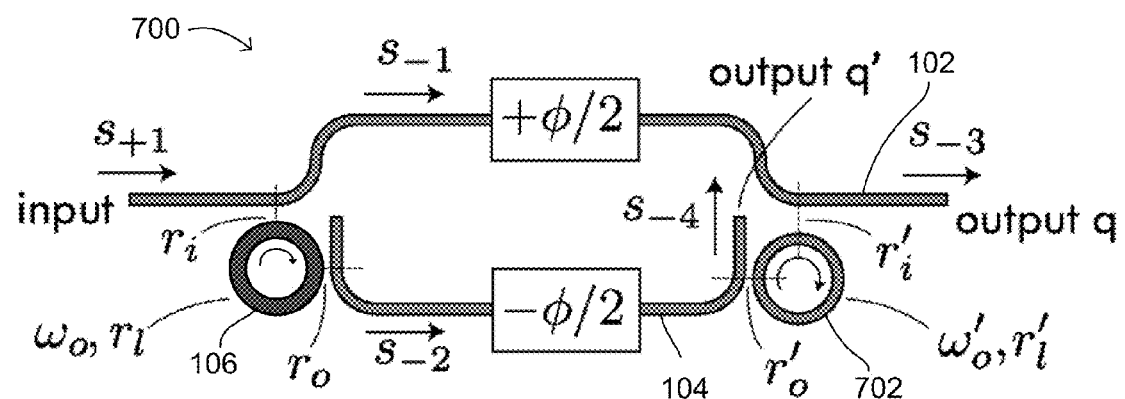
FIG. 7B is a drawing illustrating schematically an implementation of a second-order modulator including two microring resonators in accordance with one embodiment.

The device depicted in FIG. 1B may be modified in various ways. For example, as illustrated in FIG. 7B for a modulator device 700, the broadband directional coupler may be replaced by a second resonant coupler 702. Such an optical modulator device constitutes a second-order resonant system with two poles and two zeros in the through port, and two poles and one zero in the drop port, as shown in FIG. 7A. It may be designed to avoid excessive losses in the through port at off-resonance wavelengths, and may thus be advantageously employed in wavelength-division multiplexed systems, as further explained below.

The transfer properties of device 700 depend on the resonance frequencies and coupling and loss decay rates of both resonator 106 ($w_0$, $r_i$, $r_o$, $r_l$) and the second resonator 702 ($w_0'$, $r_i'$, $r_o'$, $r_l'$), as well as the phase shift $\Phi$. The transmission amplitudes in the through and drop ports are given by:

$$T_{through} = T_0\left[(j\delta\omega + r_0 + r_l - r_i)(j\delta\omega' + r_0' + r_l' - r_i')e^{-j\phi/2} + 4\sqrt{r_i r_o r_i' r_o'}\, e^{+j\phi/2}\right]$$

$$T_{drop} = T_0\left[(j\delta\omega + r_0 + r_l + r_i)2\sqrt{r_i' r_o'}\, e^{-j\phi/2} + (j\delta\omega' + r_0' + r_l' + r_i')2\sqrt{r_i r_o}\, e^{+j\phi/2}\right]$$

$$T_0 \equiv \frac{1}{(j\delta\omega + r_{total})(j\delta\omega' - r_{total}')}$$

Figure 8A:
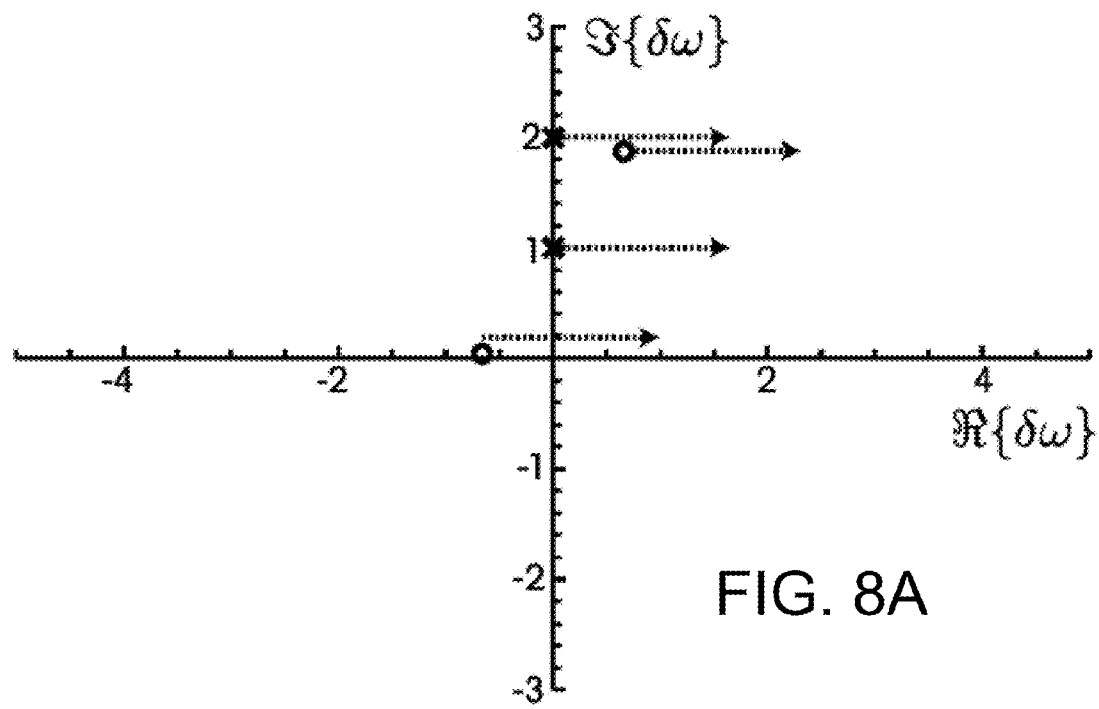
FIGS. 8A and 8B are pole-zero plots for the through and drop ports, respectively, of a second-order resonant modulator with two modulated resonators in accordance with one embodiment.
Figure 8B:
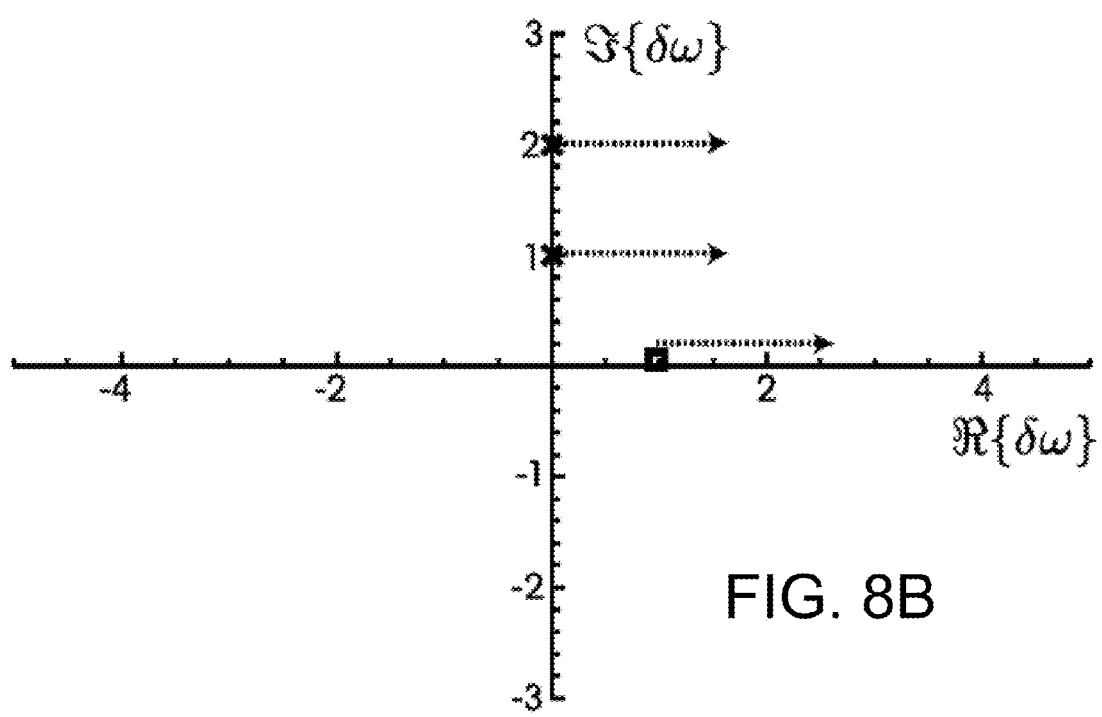
Figure 9:
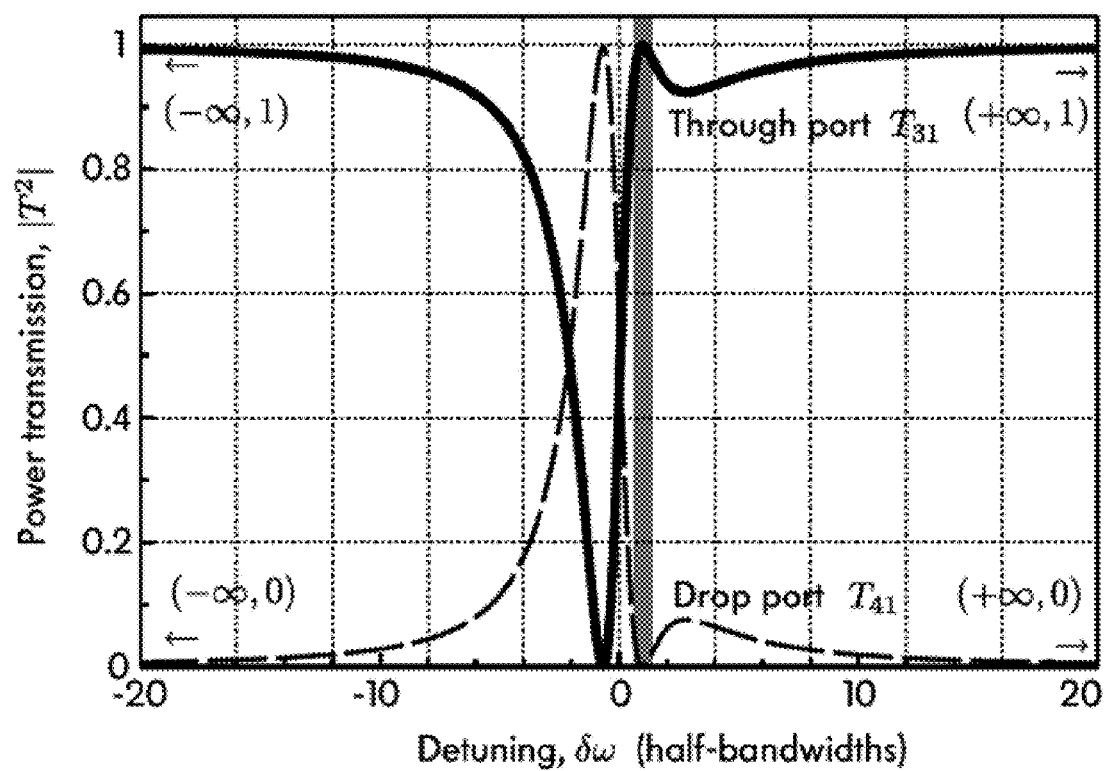
FIG. 9 is a graph showing the transfer functions of a second-order resonant modulator with two modulated resonators in the through port and drop port in accordance with one embodiment.

Assuming lossless resonators ($r=r_i'=0$) and a lossless, fully refractive modulation of both resonators, the device 700 may be optimized by placing one zero from each port on the real frequency axis, as shown, for example, in FIGS. 8A (through port) and 8B (drop port). In one embodiment, this is accomplished by choosing $r_i=0.25$, $r_o=0.75$, $\Phi=0.55\pi$, $w_0=w_0'$, $r_i'=0.2929$, and $r_o'=1.7071$. The transfer functions for this choice of parameter values are shown in FIG. 9. The device has closely spaced transmission zeros in the through and drop port, which allows for efficient modulation. Moreover, the through port has full transmission far off resonance. Thus, the modulator may be placed onto a wavelength-division multiplexer bus, and modulate one of a comb of wavelengths, while not affecting the remaining wavelengths on the bus.

Figure 10A:
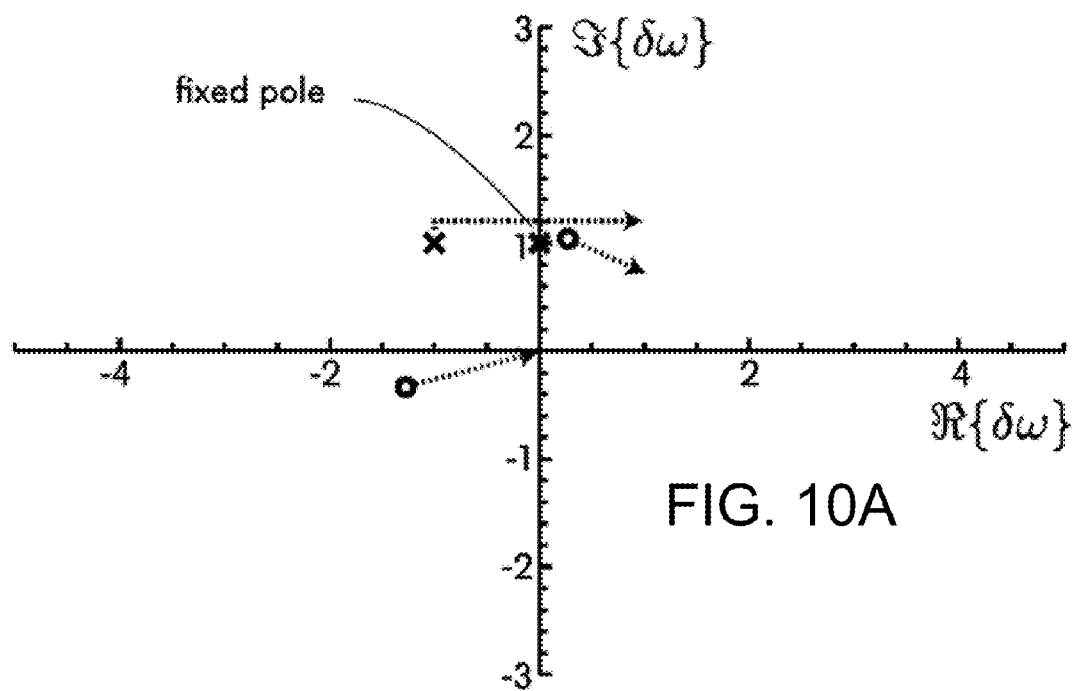
FIGS. 10A and 10B are pole-zero plots for the through and drop ports, respectively, of a second-order resonant modulator with a single modulated resonator in accordance with one embodiment.
Figure 10B:
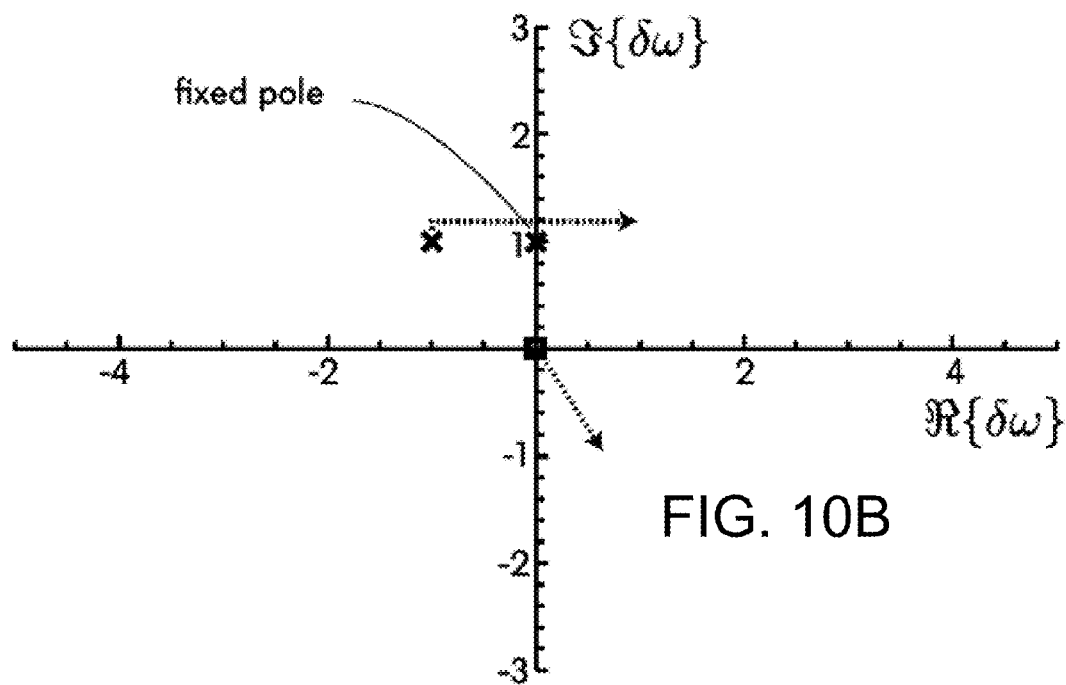
Figure 11A:
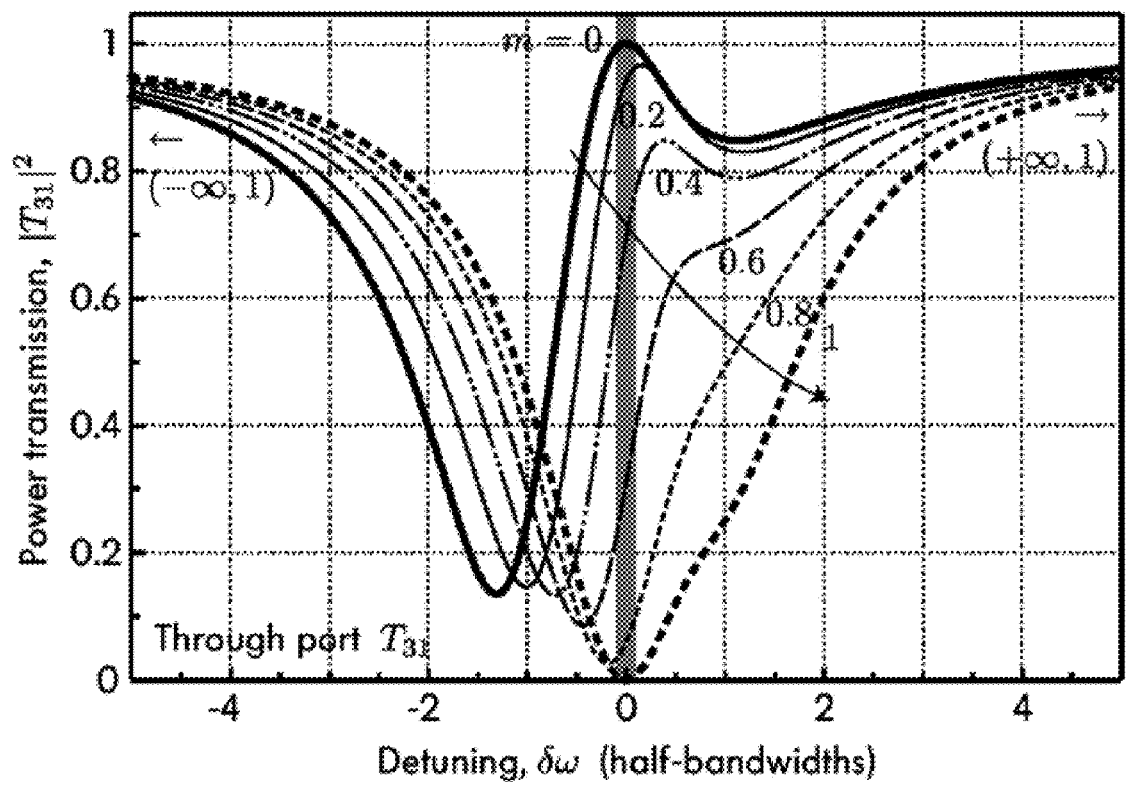
FIGS. 11A and 11B are graphs showing the transfer functions of a second-order resonant modulator with two modulated resonators in the through port and drop port, respectively, for several modulation levels in accordance with one embodiment.
Figure 11B:
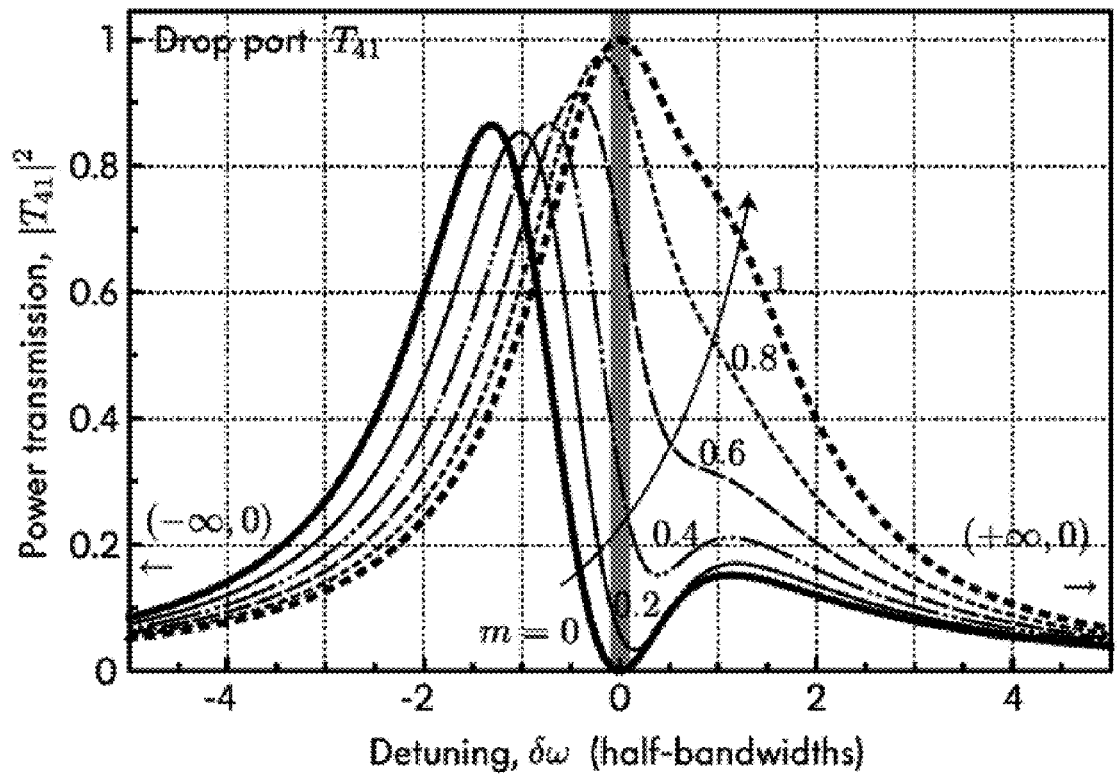

In some embodiments, only one of the resonators of device 700 (e.g., resonator 106) is modulated, while the other resonator (e.g., resonator 702) is passive. This increases energy-efficiency and reduces system complexity. In this case, the poles and zeros are translated together in the complex plane during modulation. The pole of the modulated resonator will be shifted, while the pole of the unmodulated resonator will stay fixed. The zeros may shift, in one embodiment, as illustrated in the pole-zero plots of FIGS. 10A and 10B. Therein, $r_i=r_o=0.5$, and $\Phi=\pi/2$. Further, the coupling strengths $r_i'$ and $r_o'$ of the passive ring are chosen such that they effect a 3 dB power drop at resonance. Preferably, but not necessarily, the line widths of the two resonator rings are equal, and, in that case, input and output coupling are related by $r_i'=\sin^2(\pi/8)=0.146$, $r_o'=\cos^2(\pi/8)=0.853$. The transfer functions of the through and drop ports for this embodiment are shown in FIGS. 11A and 11B, respectively.

In general, optical modulators in accordance with various embodiments of the invention may include N resonators and may, consequently, have N poles and up to N transmission zeros near a signal wavelength in each port. Typically, the number of poles $N_P$ in each transfer function is equal to the number of resonant modes N (near the signal wavelength of interest). The number of transmission zeros at finite frequency detuning from resonance ($N_{Zt}$, $N_{Zd}$ for the through and drop port responses, respectively) may differ between the two transfer functions. In general, it is equal to the number of poles, minus the smallest number of resonators that need to be traversed by light propagating from the input port to the respective output port (except that both the number of poles and the number of zeros for a transfer function may be reduced by the same number if one or more pole-zero cancellations occur, i.e., if a transmission zero occurs at the same location in the complex frequency plane as a system pole). The remaining $N_P-N_Z$ zeros are typically at infinite frequency detuning or, in practice, at very large detuning (i.e., detuning much larger than the resonant system bandwidth).

Figure 12A:
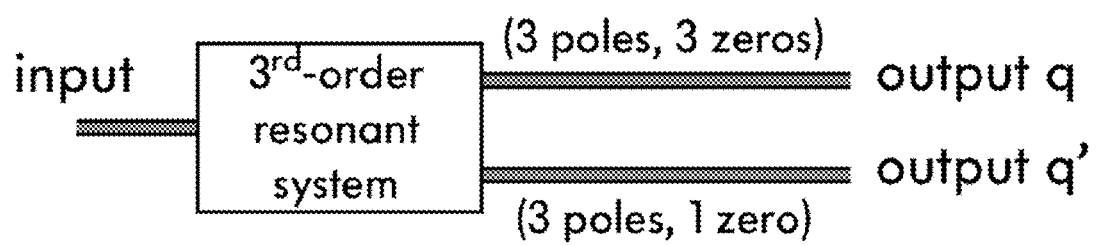
FIG. 12A is a drawing illustrating conceptually a third-order resonant modulator in accordance with various embodiments.
Figure 12B:
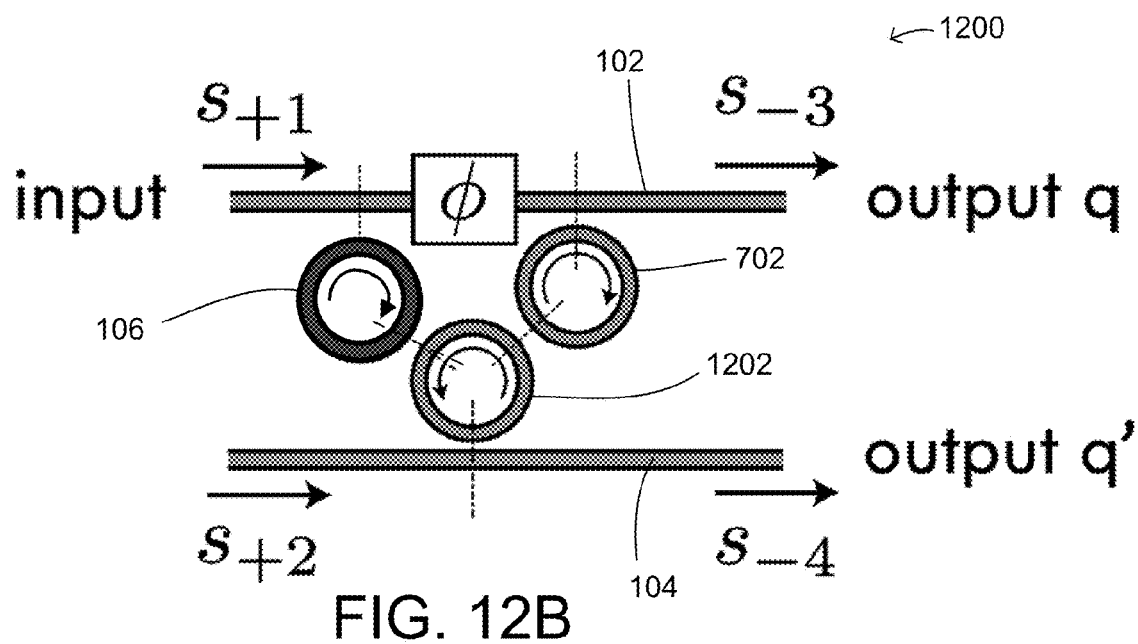
FIG. 12B is a drawing illustrating schematically an implementation of a third-order modulator including three microring resonators in accordance with one embodiment.

Multiple resonators may be utilized in optical modulators to achieve high wavelength selectivity. Such systems provide multiple paths for light to travel from the input port to the through port. For example, in the second-order system depicted in FIGS. 7A and 7B and described above, the signal may travel directly from the input port to the through port through the first waveguide, or, alternatively, may traverse the structure comprised of the first resonator, the second waveguide, and the second resonator. Similarly, in a third-order resonator system, such as the one depicted in FIGS. 12A and 12B, the signal may travel, on its way from the input to the through port, through the first waveguide or through three microring resonators. In general, wavelength-selective resonant modulators described herein have two interferometric paths, one of which crosses a resonator (i.e., does not have a direct connection between the input and output ports). Off-resonant wavelengths see only one path (the direct path), and are not disturbed. Multiple-resonator modulators as described above have fewer transmission zeros at finite frequency detuning in the drop port than poles, as at least one transmission zero is at infinite frequency detuning. This results in a fast roll-off of the signal in the drop port near resonance and, consequently, in a signal quickly approaching 100% in the through port off resonance. As a result, multiple modulators at different wavelengths may be cascaded.

Figure 13A:
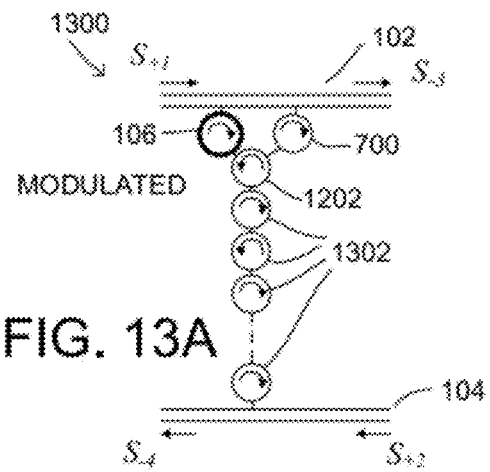
FIG. 13A is a drawing illustrating schematically a higher-order resonant modulator with a chain of microring resonators in accordance with one embodiment.
Figure 13B:
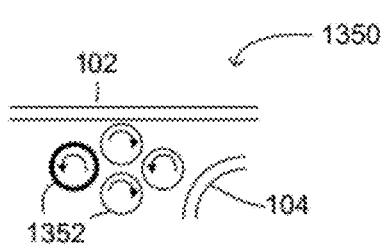
FIG. 13B is a drawing illustrating schematically a higher-order resonant modulator with a ring of microring resonators in accordance with one embodiment.

In some embodiments, the second-order structure depicted in FIG. 7B is generalized to higher order. For example, the modulator 1200 illustrated in FIG. 12B works as follows: the left and right microring resonators 106, 702, when in phase, couple coherently to the middle (bottom) microring resonator 1202, and transfer power at resonance to the drop waveguide 104, thus leaving little or no light in the through port. When the left microring 106 is modulated (i.e., shifted in resonance frequency), the relative phases change so that the left and right microrings 106, 702 excite the middle microring 1202 out of phase, so that no power builds up in the middle ring 1202, and all power continues to the through port. One advantage of such a device is that it still has only one cavity modulated to produce amplitude modulation, which renders it energy-efficient and simple to control and drive, but now the roll-off of the optical frequency response with increasing distance from resonance is of second order. This means that the response approaches 100% in the through port faster, so modulators can be cascaded at closer wavelength spacing without crosstalk. One approach to extend this to even higher order involves adding further resonators below the middle resonator 1202, between that resonator and the second waveguide 104. For example, as illustrated in FIG. 13A for a higher-order device 1300, the middle resonator 1202 may be coupled to the second waveguide 104 via a straight line of microring resonators 1302. This is sufficient to preserve interferometric cancellation in the through port (allowing a through-port zero and a drop-port zero near resonance), and multiple zeros at infinite detuning in the drop port. In an alternative higher-order modulator device 1350, depicted in FIG. 13B, the input and drop waveguides 102, 104, are coupled via a ring of four microring resonators 1352, with each waveguide coupling directly to one of the microrings.

Figure 14:
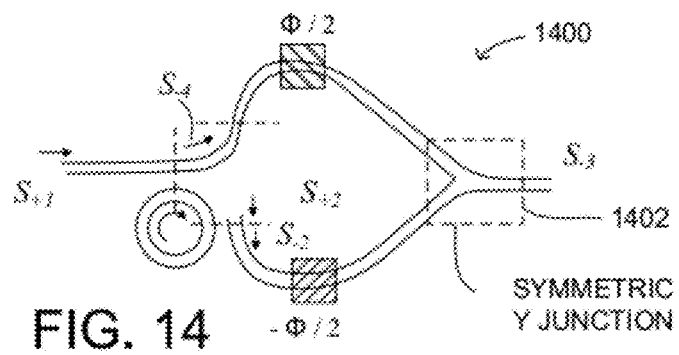
FIG. 14 is a drawing illustrating schematically a first-order modulator including a microring resonator and a Y waveguide junction in accordance with one embodiment.
Figures 15A, 15B, 15C, 15D:
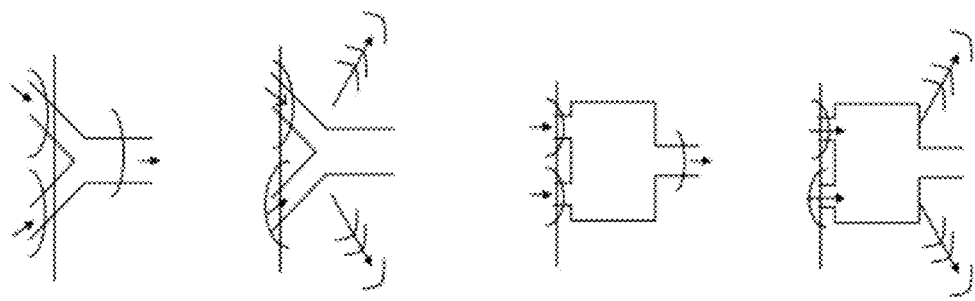
FIGS. 15A-15B are drawings illustrating schematically symmetric and asymmetric modes in a Y waveguide junction in accordance with various embodiments.
FIGS. 15C-15D are drawings illustrating schematically symmetric and asymmetric modes in a multimode interference coupler in accordance with various embodiments.

Various additional embodiments are illustrated in FIGS. 14-23. FIG. 14 illustrates a device 1400 otherwise similar to the device 100 depicted in FIG. 1B, wherein the directional coupler 108 is substituted by a Y-junction 1402, which combines the two waveguides 102, 104 to form a single output port. In this embodiment, the phase shift $\Phi$ may be adjusted by 90°. Power that would otherwise go to the drop port contributes to radiated losses; however, this is not a concern in many applications. FIGS. 15A-15D show how a symmetric mode is captured in the single-mode output waveguide, while an antisymmetric mode is radiated from the Y junction combiner (FIGS. 15A-15B) or equivalent multimode interference coupler (FIGS. 15C-15D).

Figure 16A:
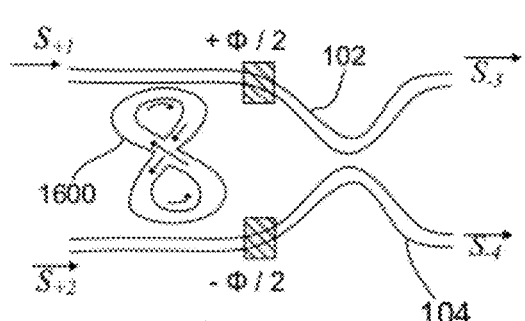
FIG. 16A is a drawing illustrating schematically a first-order modulator including a figure-eight resonator and a directional coupler in accordance with one embodiment.
Figure 16B:
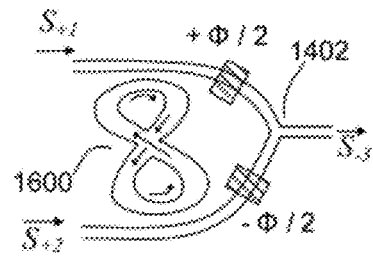
FIG. 16B is a drawing illustrating schematically a first-order modulator including a figure-eight resonator and a Y waveguide junction in accordance with one embodiment.

A symmetric implementation is shown in FIG. 16A, which utilizes a figure-eight resonator 1600 in place of the microring 106. This embodiment may also be used with a Y-junction 1402. The figure-eight resonator 1600 may include a low-loss crossing as described, for example, in U.S. patent application Ser. No. 12/288,716, filed on Oct. 22, 2008, the entire disclosure of which is hereby incorporated herein by reference.

Figure 17A:
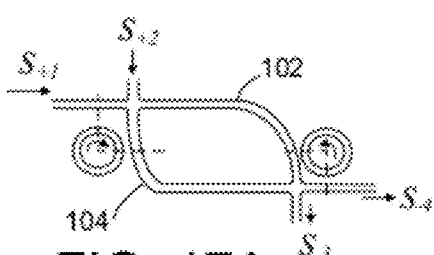
FIG. 17A-17B are drawings illustrating schematically second-order modulators with waveguide crossings in accordance with various embodiments.
Figure 17B:
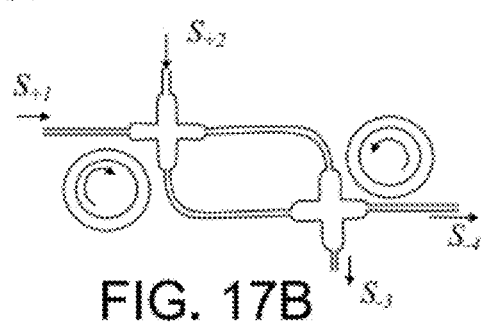
Figure 18:
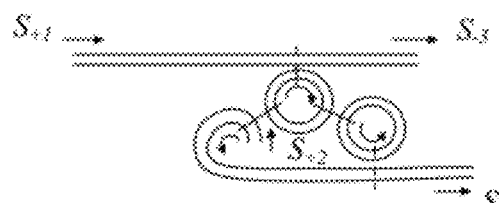
FIG. 18 is a drawing illustrating schematically a second-order modulator with two mutually coupled microring resonators in accordance with one embodiment.

FIGS. 17A-17B illustrate alternative geometries for devices functionally equivalent to the second-order modulator 700 depicted in FIG. 7B. The alternative geometries may use waveguide crossings to make all ports accessible outside the device, and at the same time balance crossing-induced losses by symmetry. FIG. 18 illustrates yet another geometry that has two poles and one zero in the drop port, and is functionally similar to that of the device 700 depicted in FIG. 7.

Figure 19A:
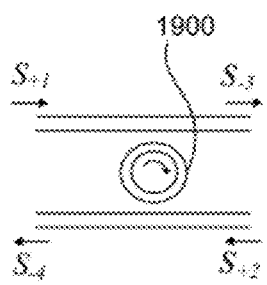
FIGS. 19A-19C are drawings illustrating schematically interchangeable coupling structures in accordance with various embodiments.
Figure 19B:
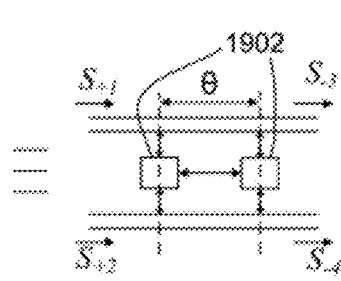
Figure 19C:
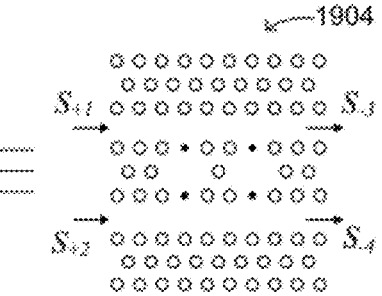
Figure 20A:
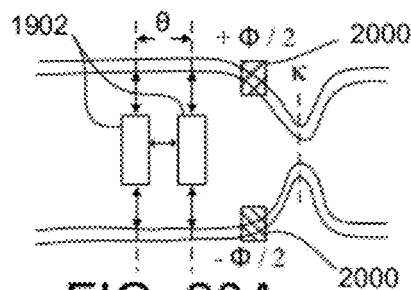
FIGS. 20A-20C are drawings illustrating schematically equivalent topologies of first-order modulators with a coupled-resonator pair and a directional coupler in accordance with various embodiments.
Figure 20B:
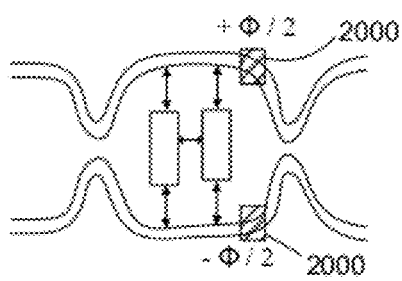
Figure 20C:
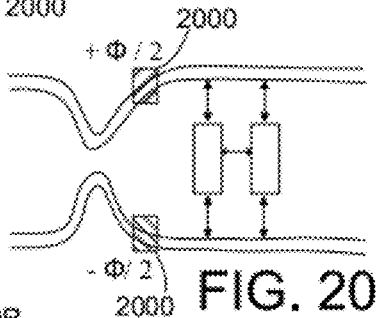
Figure 21:
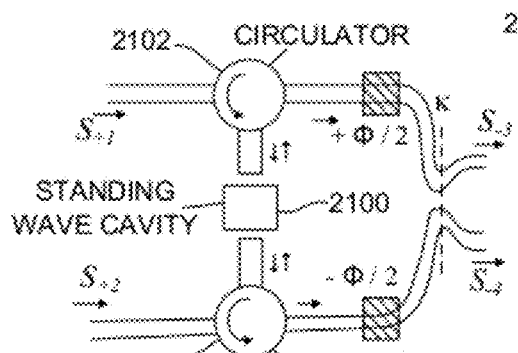
FIG. 21 is a drawing illustrating schematically a first-order modulator with a standing-wave cavity coupled to the waveguides via magnetooptic circulators in accordance with one embodiment.
Figure 22:
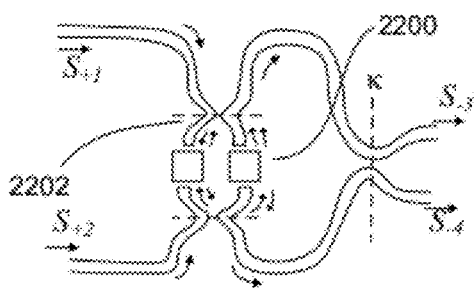
FIG. 22 is a drawing illustrating schematically a first-order modulator with a standing-wave cavity pair coupled to the waveguides via directional couplers in accordance with one embodiment.

FIGS. 19A-19C illustrates three coupling structures—a microring resonator 1900, a standing-wave cavity pair 1902, and a photonic-crystal cavity pair 1904—any of which may be used to couple the waveguides 102, 104 (in place of, e.g., microring 106). If the two standing-wave cavities or photonic-crystal cavities are appropriately mutually coupled relative to their coupling to the waveguides, with appropriate phase shifts, then these three geometries are functionally similar, and may be used interchangeably. FIGS. 20A-20C show equivalent topologies to that of the device 100 depicted in FIG. 1B, which utilize a standing-wave cavity pair 1902 followed by couplers 2000, followed and preceded by couplers 2000, or preceded by couplers 2000, respectively. The cavities couple the two waveguides, and further couple to each other. Instead of standing-wave cavities, ring resonators or photonic crystal cavities may be used. FIG. 21 illustrates yet another way of achieving a similar function as the ring device 100 depicted in FIG. 1B, using a standing-wave cavity 2100. This device further requires magnetooptic circulators 2102. In FIG. 22, a pair of standing-wave cavities 2200, excited through 3 dB couplers 2202, is shown. In this case, the two cavities are identical and not coupled to each other.

Figure 23A:
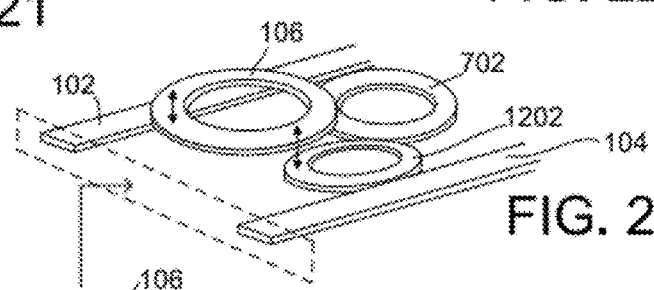
FIGS. 23A-23B are a perspective drawing and a cross-section, respectively, of a third-order resonant modulator wherein the active and passive resonators are in different layers in accordance with one embodiment.
Figure 23B:
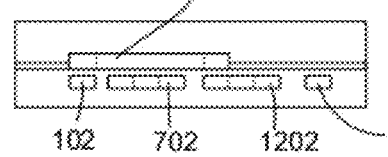

As illustrated in FIGS. 23A-23B, the structure 1200 depicted in FIG. 12 may be realized with the active resonator 106 on a second material layer level, in order to allow the active ring 106 to have a ridge-waveguide design all around the ring.

Optical modulators in accordance with the present invention may be fabricated from various semiconductor and/or insulating materials, using standard lithography and etching techniques. The fabrication of silicon structures typically starts with a silicon-on-insulator (SOI) wafer, whose top silicon layer has a thickness suitable for single-mode strongly confined waveguides. To prepare the wafer for patterning, a resist layer may be spin-coated or otherwise placed on top of the silicon layer. For subsequent patterning by electron beam lithography, sesquisiloxane may be used for the resist. Alternatively, for optical lithography, a photoresist such as polymethyl methacrylate (PMMA) may be used. HBr-chemistry-based reactive-ion etching (RIE) may then be employed to etch the mask pattern into the silicon layer. After the resist has been removed, the patterned silicon structures (e.g., waveguides, resonators, etc.) appear as raised structures on the silica layer underneath. For photonics applications, the silica layer is preferably about 2-3 µm thick, which serves to avoid optical loss by leakage into the silicon substrate.

To facilitate optical modulation, active structures may be created by doping certain regions (e.g., a resonator ring intended to have variable absorptive and resonance properties). Regions not to be doped may be protected by one or more additional masks, formed, for example, of silicon nitride, and patterned by lithography and etching. Doping may be achieved by ion implantation through a mask, or by thermal diffusion in gas atmosphere containing the ion(s) of interest. Boron may be used for p-type doping, and arsenic or phosphorus may be used for n-type doping. Typical dopant concentrations are between $10^{16}$ and $10^{20}$ ions per cubic centimeter, depending on the p-i-n junction design. Alternatively, active structures may be created by lithographically patterning a layer of metal deposited above the waveguides into a microheater—a resistive metal part in proximity to the optical structure, but sufficiently displaced to avoid introducing substantial optical losses. Passing a current through the metallic microheater will generate heat and a temperature increase in a localized region, thus creating an index change and concomitant phase shift in the optical waveguides included in the local region. An alternative is to form microheaters by using doped silicon structures in the waveguide layer, or another material layer, for conduction. Another way to create active structures includes using an electro-optic material for the waveguiding structures, and implementing electrodes that allow application of a voltage across the region containing the electro-optic waveguiding structures.

Similar techniques may be employed to fabricate non-silicon structures, such as structures based on III-V semiconductors like indium phosphide (InP), or on silicon nitride or other amorphous materials. Fabrication may again start with a substrate wafer, on top of which an undercladding layer with a low index of refraction, and a semiconductor layer or high-index dielectric for the waveguide core are disposed in the order listed. The waveguides are then similarly formed by lithography and etching steps. In the cases of non-crystalline core materials, such as silicon nitride, the waveguide core (SiN) layer may be deposited by plasma-enhanced chemical vapor deposition (PE-CVD), a low-pressure chemical vapor deposition (LP-CVD), or a vertical thermal reactor (VTR) process.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An optical modulator, comprising:
a first optical waveguide comprising an input port and a through port, the input port for receiving an input signal;
a first optical resonator optically coupled to the first optical waveguide, the first optical resonator being optically active and interfacing with a driver that continuously optically modulates the input signal between a first modulation state and a second modulation state;
a second optical waveguide optically coupled to the first optical resonator and comprising a drop port; and
a coupling structure optically coupling the first optical waveguide to the second optical waveguide,
wherein (i) in the first modulation state, a transfer function from the input port to the through port comprises a transmission zero at a frequency of the input signal, and (ii) in the second modulation state, a transfer function from the input port to the drop port comprises a transmission zero at the frequency of the input signal.

2. The optical modulator of claim 1 wherein the first optical resonator comprises at least one of a microring resonator, a figure-eight resonator, a standing-wave cavity pair, or a photonic crystal cavity pair.

3. The optical modulator of claim 1 wherein the coupling structure comprises a directional coupler.

4. The optical modulator of claim 3 wherein the directional coupler couples between 13% and 87% of the input signal from the first optical waveguide to the second optical wave guide.

5. The optical modulator of claim 1 wherein the coupling structure comprises one of a waveguide junction or a multimode interference coupler joining the first and second waveguides.

6. The optical modulator of claim 1 wherein the coupling structure comprises a second optical resonator.

7. The optical modulator of claim 6 wherein the coupling structure further comprises the first optical resonator.

8. The optical modulator of claim 6 wherein the first and second optical resonators are coupled directly to the first optical waveguide and via at least a third optical resonator to the second optical waveguide.

9. The optical modulator of claim 1 wherein the first optical resonator is located in a first layer of the optical modulator, and the first and second waveguides and coupling structure are located in a second layer of the optical modulator.

10. The optical modulator of claim 1 further comprising at least one phase shifter in at least one of the first and second waveguides between the first optical resonator and the coupling structure, the at least one phase shifter inducing a differential phase shift between the first and second waveguides.

11. The optical modulator of claim 10 wherein the modulation induced by the driver from the first modulation state to the second modulation state is associated with a frequency shift of a resonance of the first optical resonator and an absorption shift of the resonance of the first optical resonator, and the differential phase shift is substantially equal to the inverse tangent of a ratio of the absorption shift to the frequency shift.

12. An optical modulator, comprising:
    an optical input port for receiving an input signal;
    an optical through port;
    an optical drop port; and
    an optical resonator structure coupling the input port to the through port and the drop port, the optical resonator structure comprising an optically active resonator that interfaces with a driver that continuously optically modulates the input signal between a first modulation state and a second modulation state,
    wherein (i) in the first modulation state, a transfer function from the input port to the through port comprises a transmission zero at a frequency of the input signal, and (ii) in the second modulation state, a transfer function from the input port to the drop port comprises a transmission zero at the frequency of the input signal.

13. The optical modulator of claim 12 wherein the optical resonator structure comprises a plurality of optical resonators.

14. The optical modulator of claim 12 wherein the modulation induced by the driver from the first modulation state to the second modulation state is associated with a frequency shift of a resonance of the optically active resonator and an absorption shift of the resonance of the optically active resonator, and a differential phase shift between the through and drop ports is substantially equal to the inverse tangent of a ratio of the absorption shift to the frequency shift.

15. A wavelength-selective optical modulator, comprising:
    an optical input port for receiving an input signal;
    an optical output port;
    a first path connecting the optical input port to the optical output port, the first path comprising at least two optical resonators, at least one of the optical resonators being optically active and interfacing with a driver that continuously optically modulates the input signal between a first modulation state and a second modulation state; and
    a second path connecting the optical input port to the optical output port via a structure outside of the first path,
    wherein the at least two optical resonators are resonant at substantially the same wavelength in at least one state during the continuous optical modulation between the first modulation state and the second modulation state.

16. The wavelength-selective optical modulator of claim 15 wherein at least one of the optical resonators is passive.

17. The wavelength-selective optical modulator of claim 15 wherein a transfer function from the input port to the output port comprises a first transmission zero at a complex-frequency offset from a resonance of less than three 3 dB bandwidths and a second transmission zero at a complex-frequency offset from the resonance of more than six 3 dB bandwidths.

* * * * *